United States Patent [19]
Tanaka et al.

[11] Patent Number: 5,465,255
[45] Date of Patent: Nov. 7, 1995

[54] MULTIPLEX TRANSMISSION SYSTEM

[75] Inventors: Motoharu Tanaka, Yokohama;
Kyosuke Hashimoto, Hiratsuka;
Yusaku Himono, Tokyo, all of Japan

[73] Assignee: The Furukawa Electric Co., Ltd., Tokyo, Japan

[21] Appl. No.: 190,233

[22] Filed: Jan. 31, 1994

Related U.S. Application Data

[63] Continuation of Ser. No. 960,928, Oct. 13, 1992, abandoned.

[30] Foreign Application Priority Data

| Oct. 16, 1991 | [JP] | Japan | 3-267619 |
| Feb. 19, 1992 | [JP] | Japan | 4-031953 |
| Aug. 14, 1992 | [JP] | Japan | 4-216740 |

[51] Int. Cl.[6] .................................................. H04L 5/22
[52] U.S. Cl. ................................................ 370/85.1; 375/257
[58] Field of Search .......................... 370/27, 85.1, 85.2, 370/85.3; 371/57.1, 63, 64; 375/219, 257, 296

[56] References Cited

U.S. PATENT DOCUMENTS

| 2,133,832 | 10/1938 | Pullis | 370/27 |
| 3,671,671 | 6/1972 | Watanabe | 375/36 |
| 4,525,845 | 6/1985 | Dodds et al. | 375/36 |
| 4,638,473 | 1/1987 | Cooperman et al. | 370/27 |
| 4,792,950 | 12/1988 | Volk et al. | 371/8.2 |
| 4,888,764 | 12/1989 | Haug | 370/85.1 |
| 4,929,941 | 5/1990 | Lecocq | 340/825.14 |
| 4,994,690 | 2/1991 | Sundstrom et al. | 375/36 |
| 5,031,176 | 7/1991 | Magne et al. | 371/8.2 |
| 5,050,187 | 9/1991 | Ichie | 375/36 |
| 5,125,006 | 6/1992 | Marinaro | 375/36 |
| 5,182,745 | 1/1993 | Heichler | 370/85.1 |

FOREIGN PATENT DOCUMENTS

| 0295897 | 12/1988 | European Pat. Off. . |
| 2627036 | 8/1989 | France . |
| WO84/00862 | 3/1984 | WIPO . |

*Primary Examiner*—Benedict V. Safourek
*Assistant Examiner*—Chau T. Nguyen
*Attorney, Agent, or Firm*—Frishauf, Holtz, Goodman, Langer & Chick

[57] ABSTRACT

A multiplex transmission system according to the present invention is provided with a plurality of multiplex nodes which are connected in parallel with two common buses so that data are transmitted between the nodes. A receiver circuit of each multiplex node includes a passive potential detector section and bias sections. In case of any trouble on the buses, in this multiplex transmission system, the passive potential detector section detects the respective passive-mode potentials of the buses, controls the bias sections in accordance with the detected passive potentials, and sets input potentials within a predetermined range, thereby enabling data transmission between the multiplex nodes.

14 Claims, 20 Drawing Sheets

MULTIPLEX TRANSMISSION SYSTEM

This application is a continuation of application Ser. No. 07/960,928, filed Oct. 13, 1992, now abandoned.

BACKGROUND OF THE INVENTION

1. Field of the Invention

The present invention relates to a multiplex transmission system for data transmission between multiplex nodes which are connected to common signal transmission lines.

2. Description of the Related Art

Multiplex transmission systems of this type include LAN (local area network) transmission systems which combine CSMA/CD (carrier sense multiple access/collision detection) and NDA (non-destructive arbitration) or use tokens. As a typical LAN, a CAN (controller area network) or the like is used for data transmission in an automobile, for example.

One such multiplex transmission system is described in, e.g., Japanese Patent Application No. H2-113751 (Laid-open Publication No. H4-10828). This system is provided with terminal circuits which include terminal resistors. These resistors are connected to the respective both ends of multiplex transmission lines which constitute this system.

Due to the use of the terminal resistors, in a conventional multiplex transmission system, failure of one multiplex transmission line influences the other normal transmission lines, and the damaged transmission line cannot be separated. According to the system described above, therefore, a plurality of multiplex nodes, each including a transmission control circuit and a reception control circuit, are connected to one another by means of three common multiplex transmission lines. One of the multiplex nodes detects failure when the node can not communicate with other multiplex nodes, and a voltage generator circuit of this multiplex node changes the voltage of any one of the multiplex transmission lines, thereby changing the state of data transmission between the individual transmission lines. Based on this change of the transmission state, the transmission control circuit and the reception control circuit of each multiplex node can achieve multiplex transmission of data.

According to this multiplex transmission system, the reception control circuit must switch the multiplex transmission line for data reception in changing the transmission state, so that the configuration of the circuit is complicated, and there is such a risk that it takes much time to manufacture it. If the circuit configuration of this system is complicated, moreover, the ground potential difference between the multiplex nodes may be too small for accurate data transmission, in some cases.

According to this multiplex transmission system, furthermore, transmission waveforms collapse in the transmission control circuit, due to the difference in switching speed between drivers on the source current and sink current sides, so that the reception control circuit sometimes cannot normally receive the data. If one of the terminal resistors of this system is disengaged, moreover, reflected waves are produced on the multiplex transmission lines, so that the transmission waveforms collapse, possibly preventing normal data reception in the reception control circuit.

SUMMARY OF THE INVENTION

The present invention has been contrived in consideration of these circumstances, and has an object to provide a multiplex transmission system in which data can be transmitted between multiplex nodes even in case of failure of signal transmission lines, and accurate data transmission can be effected even under severe conditions in an automobile.

Another object of the present invention is to provide a multiplex transmission system in which collapse of transmission waveforms, attributable to a difference in switching speed between drivers, can be corrected.

Still another object of the present invention is to provide a multiplex transmission system in which the influence of reflected waves can be restrained even if one of terminals is disengaged.

The above object is achieved by a multiplex transmission system according to the present invention, which comprises terminal circuits for individually connecting the respective terminal portions of signal transmission lines; and each of the multiplex nodes including a transmitter circuit for generating the potential difference on the signal transmission lines in accordance with a signal from a communication control circuit, and a receiver circuit including passive potential detecting means for detecting the potential when the state of each of the signal transmission lines being in a passive state and bias means for analogously changing input potentials from the individual signal transmission lines in accordance with the passive-state potential detected by means of the passive potential detecting means.

According to the multiplex transmission system described above, a receiver circuit of each multiplex node is provided with a passive potential detector section, for use as the passive potential detecting means, and a bias section as the bias means, for example. The bias section applies an analog bias to input lines (buses), which are connected individually to the signal transmission lines, on the basis of the potential in a passive state (state without data) detected by the passive potential detector section, thereby setting the respective input potentials of the input lines within a predetermined potential range without regard to potential variations of the transmission lines. Thus, if the potential of any signal transmission line varies due to failure of the transmission line, a potential difference is produced between the input lines when the signal transmission line is brought to a dominant state (state in which a potential difference is produced between the signal transmission lines), so that the data can be received.

Further, the terminal circuits may be provided with bias resistors, and bias voltage is applied across the bias resistors in a manner such that one signal transmission line is connected to the ground and the other to the power supply. If one terminal is disengaged, in this case, the influence of reflected waves can be restrained, so that the data can be normally received.

Furthermore, the transmitter circuit and the terminal circuits may be provided with restraining means, e.g., capacitors, so that a switching delay between drivers can be absorbed to shape up transmission waveforms.

DETAILED DESCRIPTION

Figure 1:
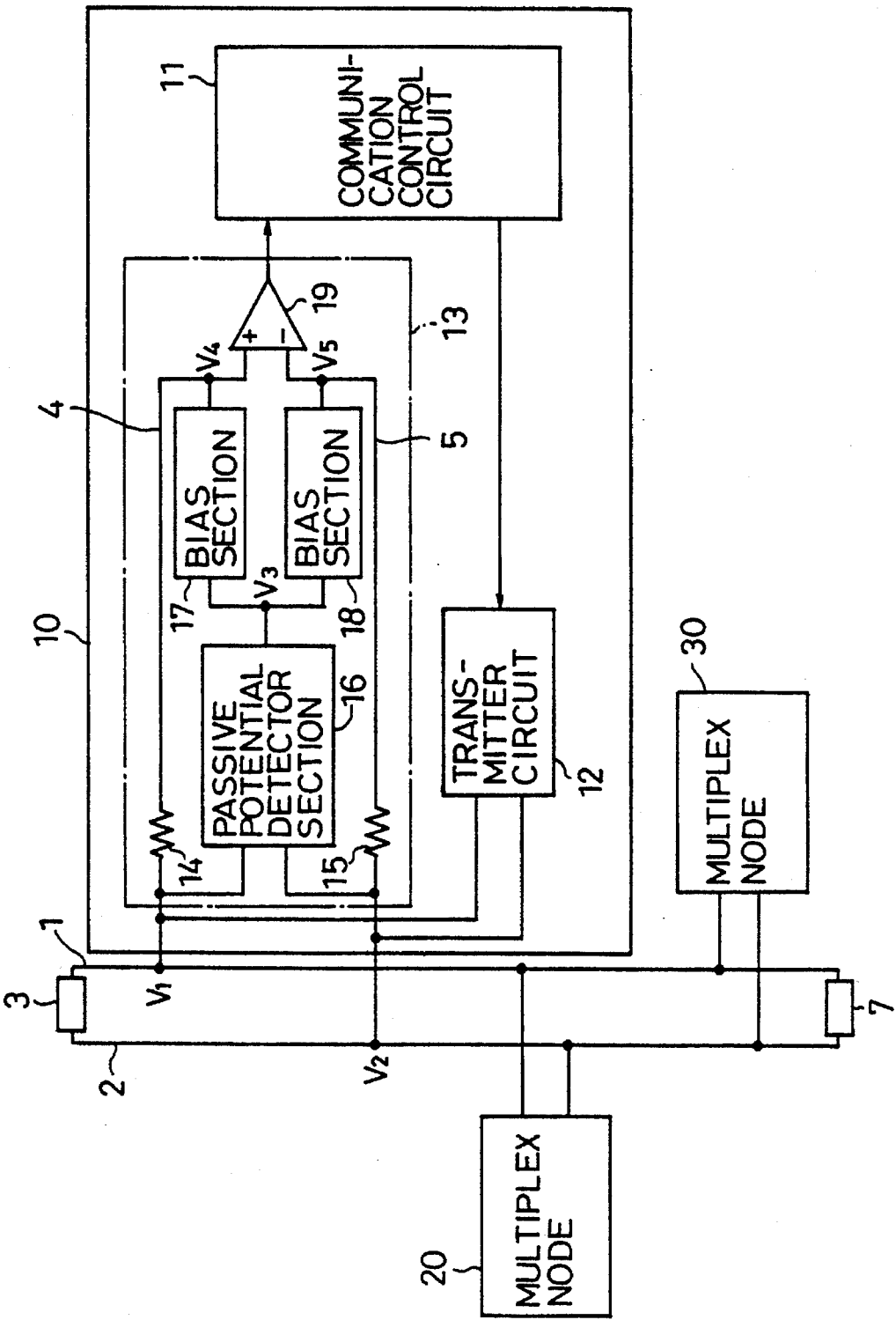
FIG. 1 is a block diagram illustrating an arrangement of a multiplex transmission system according to the present invention.

Referring to FIG. 1, a multiplex transmission system according to the present invention comprises a plurality of multiplex nodes 10, 20 and 30 and multiplex transmission lines (buses) 1 and 2. The multiplex nodes 10, 20 and 30 are connected individually in parallel with two common buses 1 and 2, and data signals are transmitted through the buses 1 and 2. Terminal circuits 3 and 7 are connected individually to the opposite ends of the buses 1 and 2. These multiplex nodes 10, 20 and 30 are constructed in the same manner, so that only the arrangement of the node 10 will be described below for simplicity.

The multiplex node 10 is composed of a communication control circuit for communication processing control, a transmitter circuit 12 for receiving transmitter signals from the control circuit 11 and sending them to the buses 1 and 2, a receiver circuit 13 for delivering receiver signals, fetched from the buses 1 and 2, to the circuit 11, and the like.

The communication control circuit 11 performs communication processing control such that it fetches output signals from various apparatuses (not shown) connected thereto, frames these output signals in predetermined data units, and delivers the framed signals as the transmitter signals to the transmitter circuit 12. Like these transmitter signals, framed receiver signals are fetched from the receiver circuit 13 by the control circuit 11. Also, the communication control circuit 11 fetches only necessary signals for local use, among other receiver signals, and delivers them to the individual apparatuses connected thereto. If signals transmitted from the other multiplex nodes are normally received by the receiver circuit 13, furthermore, the control circuit 11 performs communication processing control such that it delivers a reception acknowledgment signal (hereinafter referred to as ACK signal) to the transmitter circuit 12.

The transmitter circuit 12, which is connected to the buses 1 and 2, transmits the transmitter signals (including the ACK signal) from the communication control circuit 11 to the buses 1 and 2 in a transmission mode for multiplex transmission. The circuit 12 is provided with a noise killer circuit (mentioned later) which prevents noises from being generated from the buses during the transmission.

The receiver circuit 13 is composed of resistors 14 and 15, a passive potential detector section 16, bias sections 17 and 18, and a reception comparator 19.

Figure 2:
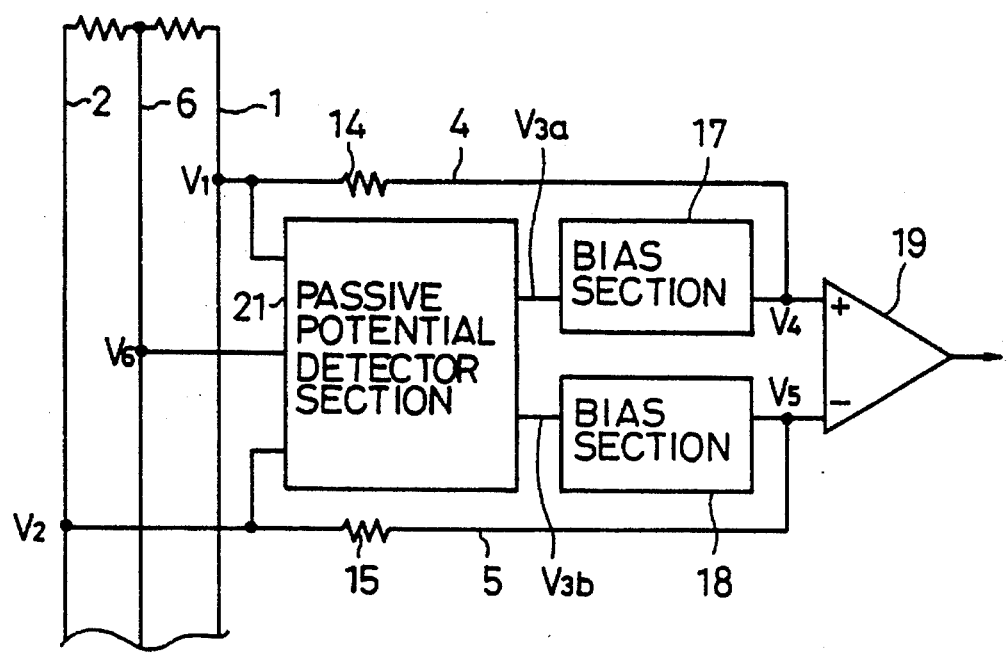
FIG. 2 is a circuit diagram illustrating an arrangement of a second embodiment of a receiver circuit according to the present invention.
Figure 3:
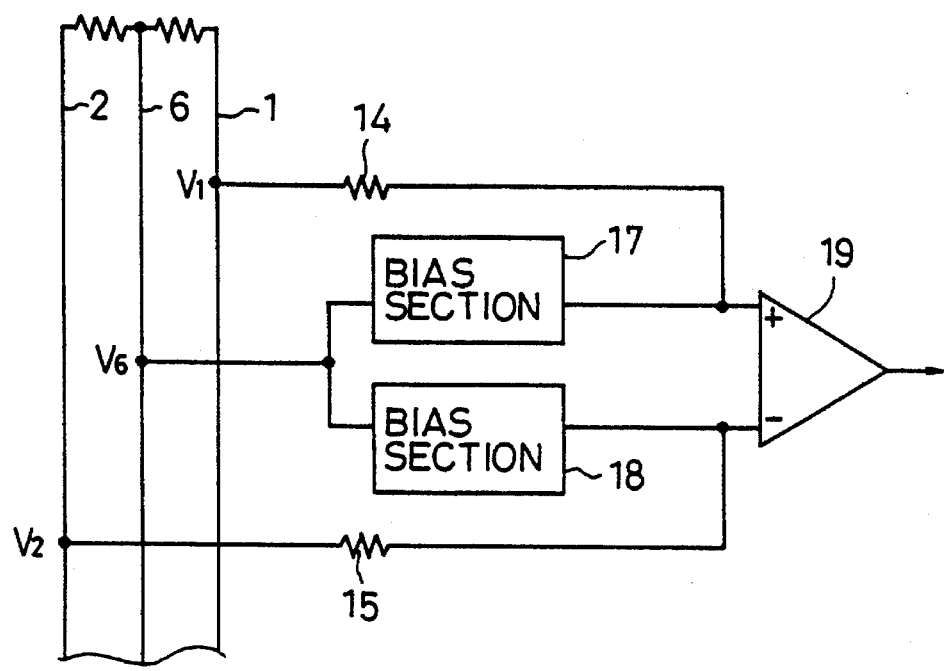
FIG. 3 is a circuit diagram illustrating an arrangement of a third embodiment of the receiver circuit.

FIGS. 2 and 3 are circuit diagrams illustrating second and third embodiments, respectively, of the receiver circuit, in which three signal transmission lines are used. In these cases, the receiver circuit basically operates in the same manner as in the arrangement of FIG. 1 in which the signal transmission lines are two in number, and therefore, the particulars thereof are omitted. One of multiplex nodes controls a voltage setting circuit (not shown), and the potential of a bus 6 is fixed without regard to its mode, dominant or passive. If the potential of the bus 6 is a passive one, no passive potentials have to be detected. As in the case of the third embodiment shown in FIG. 3, therefore, a passive potential detector section 21 may be omitted. In FIGS. 1, 2 and 3 and the subsequent drawings, like reference numerals are used to designate like components throughout the several views for simplicity of illustration.

Figure 4:
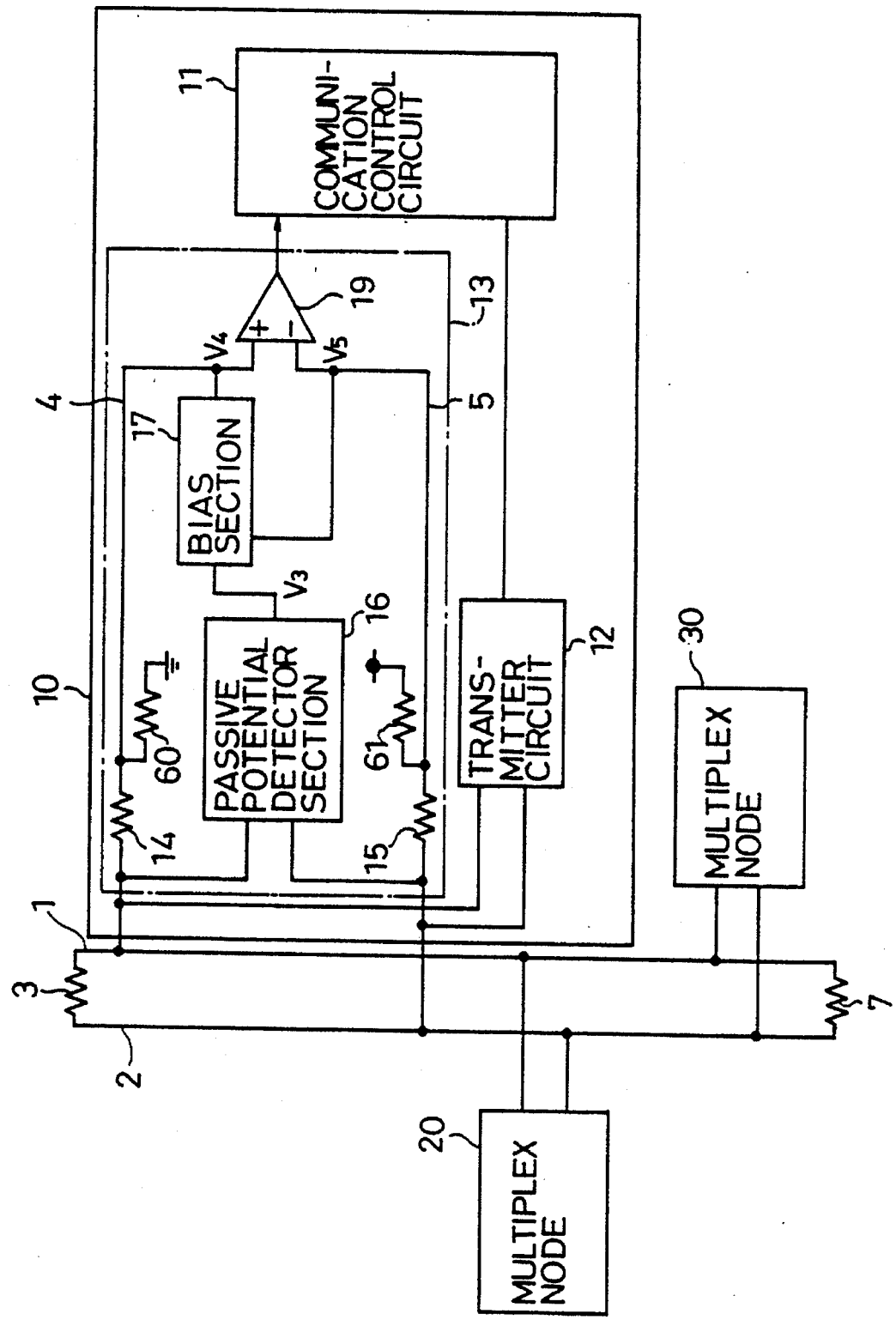
FIG. 4 is a circuit diagram illustrating an arrangement of a fourth embodiment of the receiver circuit.
Figure 5:
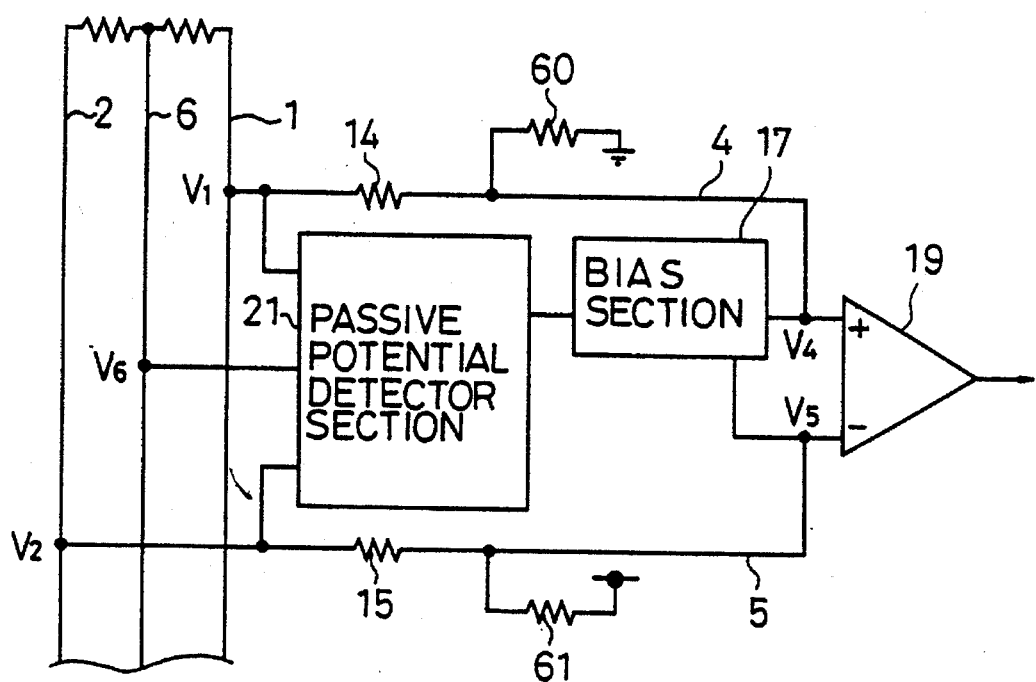
FIG. 5 is a circuit diagram illustrating an arrangement of a fifth embodiment of the receiver circuit.
Figure 6:
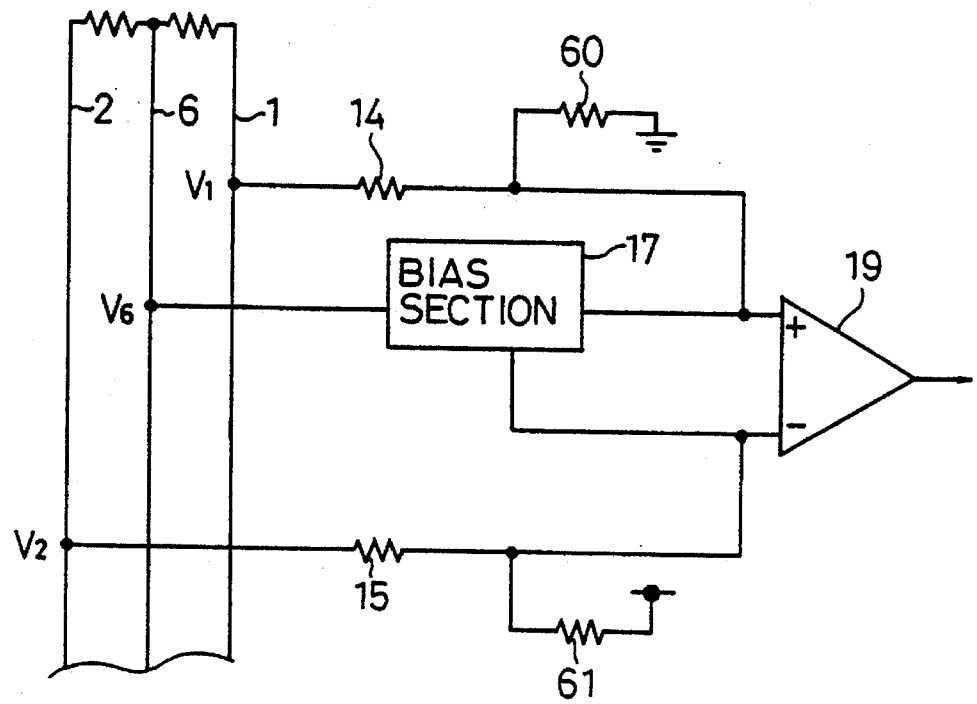
FIG. 6 is a circuit diagram illustrating an arrangement of a sixth embodiment of the receiver circuit.

In the present invention, moreover, only one bias section may be used in place of the two. Referring to FIGS. 4 to 6, resistors 60 and 61 for differentiating the respective potentials of input lines (buses) 4 and 5 are connected to the buses 4 and 5, respectively, in these embodiments.

The resistors 14 and 15 are connected to the reception comparator 19 by means of the buses 4 and 5, respectively, and serve as attenuators for lowering the respective potentials V1 and V2 of the buses 1 and 2 to levels such that the comparator 19 can receive signals.

Figure 7:
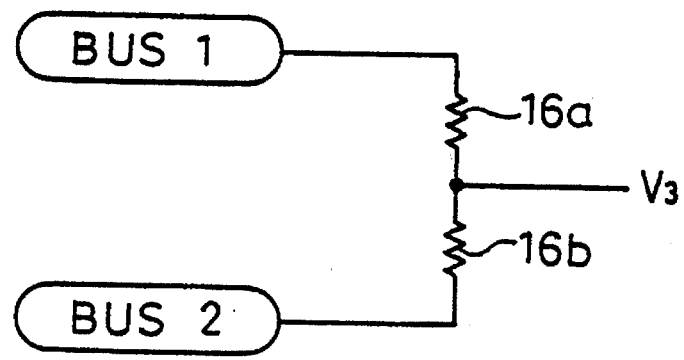
FIG. 7. is a circuit diagram illustrating an arrangement of a first embodiment of a passive potential detector section shown in FIG. 1.

In the passive potential detector section 16, as shown in FIG. 7, resistors 16a and 16b are connected between the buses i and 2, and an intermediate potential is detected as a passive-mode potential V3 of the buses 1 and 2. The potential V3 is delivered to the bias sections 17 and 18 in the arrangement of FIG. 1. In the arrangement of FIG. 4, on the other hand, the potential V3 is delivered to the bias section 17.

Figure 8:
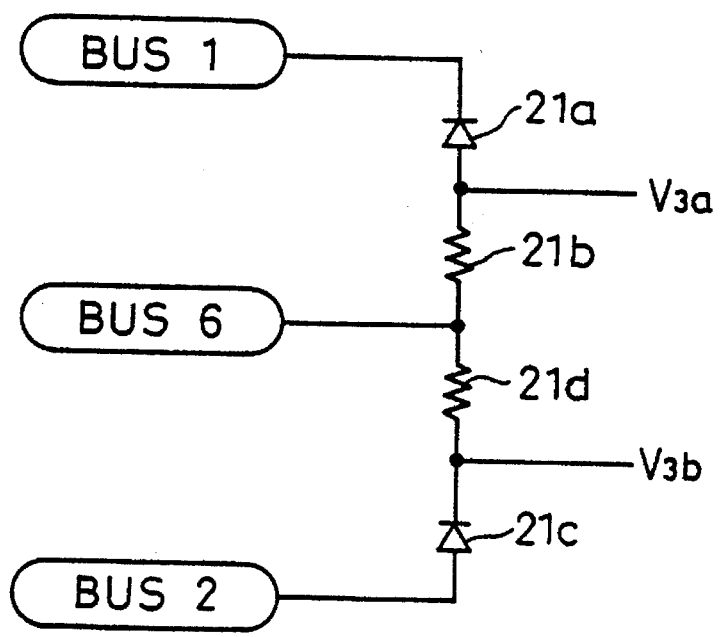
FIG. 8 is a circuit diagram illustrating an arrangement of a second embodiment of the passive potential detector section.

FIG. 8 illustrates a detailed circuit arrangement of the potential detector section 21 shown in FIG. 2. As shown in FIG. 8, the detector section 21 is composed of a diode 21a and a resistor 21b connected to the buses 1 and 6, respectively, and a diode 21c and a resistor 21d connected to the buses 2 and 6, respectively. Potentials V3a and V3b delivered from between these diodes and resistors are used as passive potentials. The passive potentials V3a and V3b are set so that they output the potential V6 of the bus 6 when $V1 \geqq V6 \geqq V2$ is given, that the potential V3a outputs the potential V1 of the bus 1 when V1<V6 is given, and that the potential V3b outputs the potential V2 of the bus 2 when V6<V2 is given. When passive and dominant modes are established on the bus, therefore, the input waveforms of the comparator 19 correspond to potentials within a predetermined range. At the point of change of the modes, the input waveforms of the comparator 19 cross. This situation will be described in detail later.

Figure 9:
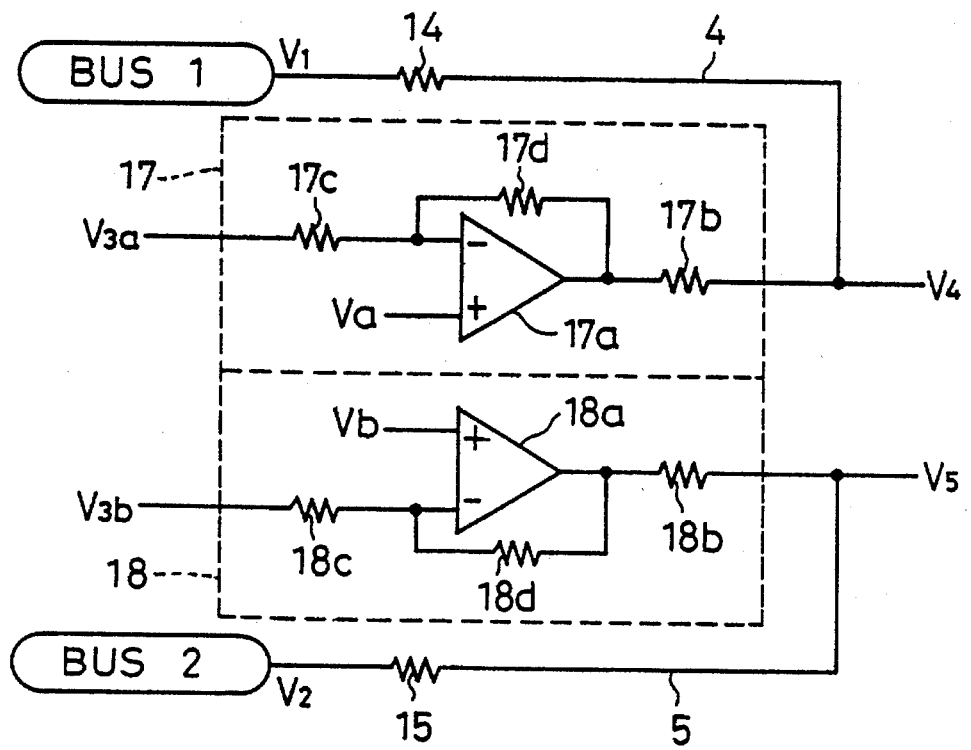
FIG. 9 is a circuit diagram illustrating an arrangement of a first embodiment of bias sections shown in FIG. 1.
Figure 10:
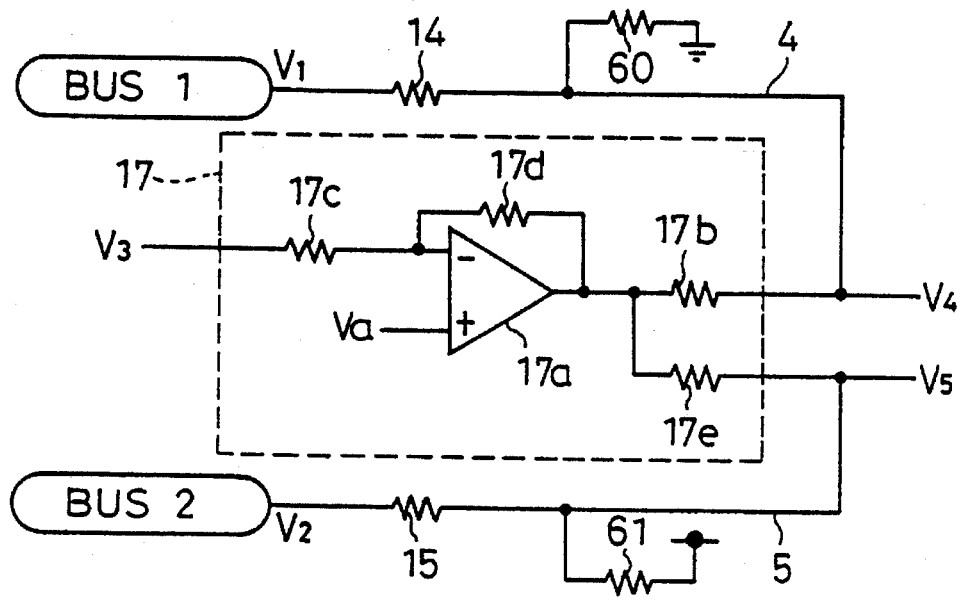
FIG. 10 is a circuit diagram illustrating an arrangement of a second embodiment of the bias section.

Referring to FIG. 9, the bias section 17 is composed of an operational amplifier 17a and resistors 17b to 17d, and the bias section 18 is composed of an operational amplifier 18a and resistors 18b to 18d. The bias sections 17 and 18 applies an analog bias to the buses 4 and 5, corresponding to the passive potentials V3a and V3b (potential V3 for the case of two signal transmission lines shown in FIG. 1) inputted from the passive potential detector section 21, so that potentials V4 and V5 of the buses 4 and 5 are set within a predetermined range without regard to variations of the potentials of the buses 1 and 2. These bias sections may reduced to one in number. FIG. 10 shows an embodiment for this case, in which resistors 17e, 60 and 61 are additionally used.

When an input reference potential Va is applied to a positive input terminal of an operational amplifier 17a, in the bias section 17 shown in FIG. 9, the output potential of the amplifier 17a acts so that the potential of a negative input terminal of the amplifier 17a is equal to the reference potential Va. Thus, the potential V4 can be set within the predetermined range.

Let us examine the values of the potential V4 obtained when the buses are in the passive mode (potential of bus 1≦potential of bus 2 for two signal transmission lines; potential of bus 1≦potential of bus 6≦potential of bus 2 for three signal transmission lines, according to the embodiment) and when the buses are in the dominant mode (potential of bus 1>potential of bus 2 for two signal transmission lines; potential of bus 1> potential of bus 6 or potential of bus 6>potential of bus 2 for three signal transmission lines, according to the embodiment), where the ratios between the respective resistance values R1, R2, R3 and R4 of the resistors 14, 17b, 17c and 17d are adjusted to the relation R1:R2=R3:R4.

When the buses are in the passive mode, that is, when the input potential V1 of the bus 1 is equal to the passive potential V3a, voltage drops between the resistors 14 and 17c and between the resistors 17b and 17d are equal, so that the potential Va is equal to the potential V4. This holds even though the passive potential V3a varies.

Figure 11A:
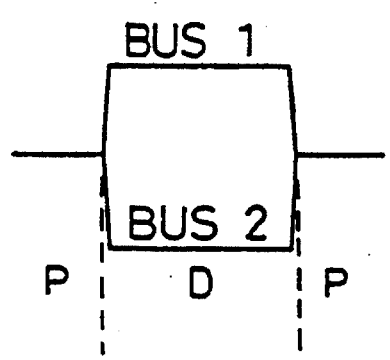
FIGS. 11(a)–(f) show diagrams illustrating data signal waveforms and receiver signal waveforms on the buses shown in FIG. 1.
Figure 11B:
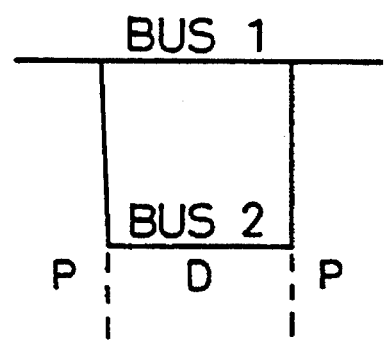
Figure 11C:
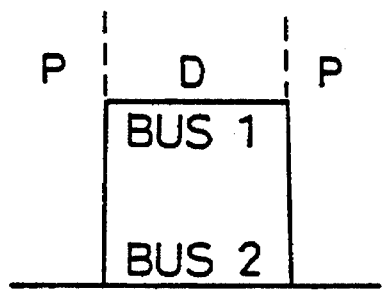
Figure 11D:
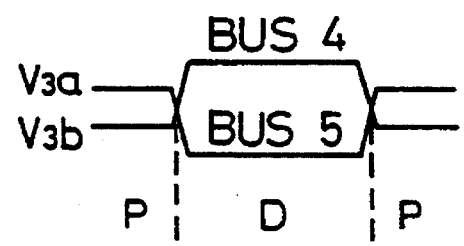
Figure 11E:
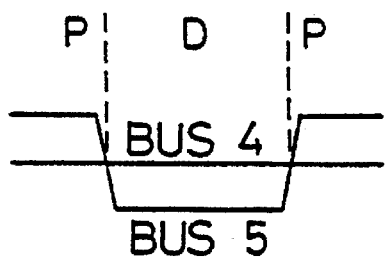
Figure 11F:
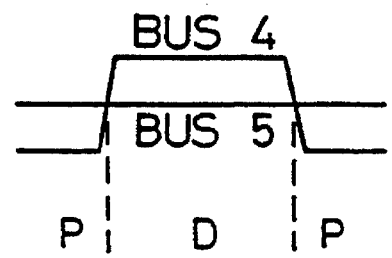
Figure 12A:
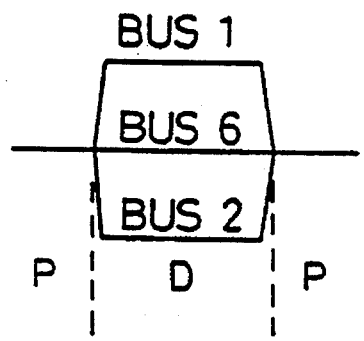
FIGS. 12(a)–(g) show diagrams illustrating data signal waveforms on the buses shown in FIG. 2.
Figure 12B:
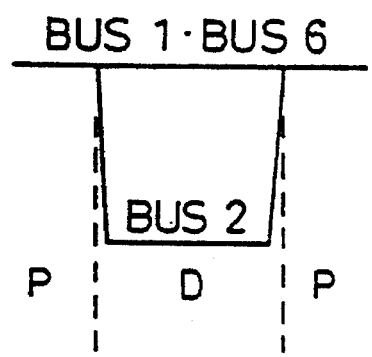
Figure 12C:
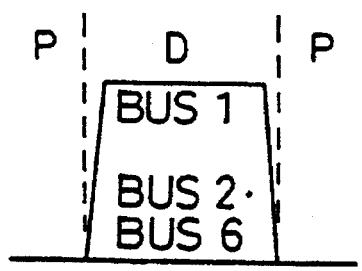

When the buses 1 and 2 in the dominant mode are normal, or when the bus 2 is out of order, that is, when the bus 2 is shorted to the power supply or ground, as shown in FIG. 11(a) or 11(c) (when the buses 1, 2 and 6 are normal, when the bus 2 is snapped or shorted to the ground, when the buses 1 and 2 are shorted to each other, or when the bus 2 is shorted to the power supply, as shown in FIG. 12(a), 12(c), 12(e) or 12(g), in the case of three signal transmission lines), the input potential V1 is higher than the passive potential V3a, so that the potential V4 of the bus 4 is higher than the reference potential Va (see FIGS. 11(d) and 11(f)). When the bus 1 is shorted to the power supply or ground, as shown in FIG. 11(b) (when the bus 1 is snapped or shorted to the power supply, or when the bus 1 is shorted to the ground, as shown in FIG. 12(b), or 12(f), in the case of three signal transmission lines), however, the potential of the bus 1 does not vary and the potential V3a is equal to the potential V1, so that the potentials V4 and Va are equal without regard to the state, passive or dominant (FIG. 11(e)).

Moreover, as shown in FIG. 12 (d), when the buses 1 and 2 are shorted to each other, the potential of the bus 1 varies to a reverse direction to the direction which should substantially varies, however, V3a at the dominant mode is equal to V1, so that the potential V4 is fixed without regard to the mode, passive or dominant, as shown FIG. 11 (e).

When an input reference potential Vb is applied to a positive input terminal of an operational amplifier 18a, also in the bias section 18, the output potential of the amplifier 18a acts so that the potential of a negative input terminal of the amplifier 18a is equal to the reference potential Vb. Thus, the potential V5 can be set within the predetermined range.

Let us examine the values of the potential V5 obtained when the buses are in the passive mode and in the dominant mode, where the ratios between the respective resistance values R5, R6, R7 and R8 of the resistors 15, 18b, 18c and 18d are adjusted to the relation R5:R6=R7:R8.

When the buses are in the passive mode, that is, when the input potential V2 of the bus 2 is equal to the passive potential V3b, voltage drops between the resistors 15 and 18c and between the resistors 18b and 18d are equal, so that the potential Vb is equal to the potential V5. This holds even though the passive potential V3b varies.

When the buses 1 and 2 in the dominant mode are normal, or when the bus 1 is out of order, that is, when the bus 1 is shorted to the power supply or ground, as shown in FIG. 11(a) or 11(b) (when the buses 1, 2 and 6 are normal, when the bus 1 is snapped or shorted to the power supply, when the buses 1 and 2 are shorted to each other, or when the bus 1 is shorted to the ground, as shown in FIG. 12(a), 12(b), 12(d) or 12(f), in the case of three signal transmission lines), the input potential V2 is lower than the passive potential V3b, so that the potential V5 of the bus 5 is lower than the reference potential Vb (see FIGS. 11(d) and 11(e)). When the bus 2 is shorted to the power supply or ground, as shown in FIG. 11(c) (when the bus 2 is shorted to the ground, or when the bus 2 is shorted to the power supply, as shown in FIG. 12(c), or 12(g), in the case of three signal transmission lines), however, the potential of the bus 2 does not vary and the potential V3b is equal to the potential V2, so that the potentials V5 and Vb are equal without regard to the mode, passive or dominant (FIG. 11(f)).

Moreover, as shown in FIG. 12 (e), when the buses 1 and 2 are shorted to each other, the potential of the bus 2 varies to a reverse direction to the direction which should substantially varies, however, V4a at the dominant mode is equal to V2, so that the potential V5 is fixed without regard to the mode, passive or dominant, as shown FIG. 11 (f).

At this time, the input reference potential Va is lower than the potential Vb, and the resistance values R1 to R8 of the resistors 14, 17b to 17d, 15, and 18b to 18d are adjusted so that voltage variations for the dominant mode cross one another when the passive mode changes into the dominant mode.

When the reception comparator 19, comparing the potentials V4 and V5 inputted from the buses 4 and 5, recognizes received data signals (including the ACK signal), it delivers the signals to the communication control circuit 11.

In the receiver circuit 13 according to the present invention, the reception comparator 19 can exhibit data without regard to the potentials V1 and V2 of the buses 1 and 2 if the passive mode (indicated by "P") and the dominant mode (indicated by "D") are established on the buses 1 and 2, as shown in FIGS. 11(a) to 11(c) and FIGS. 12(a) to 12(g). In this embodiment, the respective waveforms of the received data signals get within a voltage range for reception, and are crossed at the points of change of the signals (from the passive mode to the dominant mode, and vice versa). In the passive mode, as shown in FIGS. 11(d) to 11(f), the respective potentials V4 and V5 of the buses 4 and 5 are set within the fixed range so that the potential V4 is lower than the potential V5. In the dominant mode, on the other hand, the potential V4 is higher than the potential VS. Thus, the potentials V4 and V5 for the passive and dominant modes cross each other.

Thus, in this embodiment, the receiver circuit of each multiplex node applies the bias to the buses 4 and 5 for the data signals, connected to the signal transmission lines 1 and 2, respectively, on the basis of the potentials for the passive mode, thereby setting the received potentials within the predetermined range. Even if the potentials of the buses 1 and 2 vary due to failure of the buses, therefore, the communication control circuit 11 can recognize the data signals on the buses 1 and 2 when the buses 1 and 2 become dominant.

The following is a description of the principle of operation of a second embodiment of the receiver circuit 13, in which three signal transmission lines are used, as shown in FIGS. 2 and 5.

The case of the bus 1 will be described first. If the signal waveforms on the bus are the ones shown in FIGS. 12(a), 12(b), 12(c), 12(e) and 12(g), the potential of the bus 1 cannot change in the opposite direction (or become lower than the potential of the bus 6) in the dominant mode and in a state of which the passive-mode potentials of the buses 1 and 6 are equal. Therefore, the passive potential detector section 21 delivers the potential V6 of the bus 6 as the potential V3a (see FIG. 8) to the bias section 17. Thus, the passive-mode potential V4 of the bus 4 is set within the predetermined range. The reference potential Va and the passive-mode potential V4 are equal if the then ratios between the respective resistance values R1, R2, R3, R4 and R9 of the resistor 14, 17b, 17c, 17d and 21b are adjusted to the relation R1:R2=(R9+R3):R4.

Figure 12D:
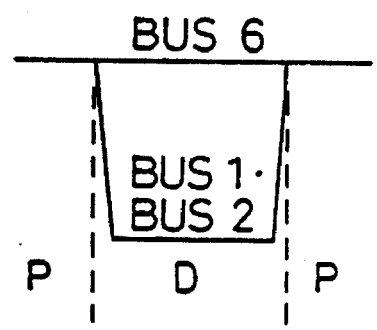
Figure 12E:
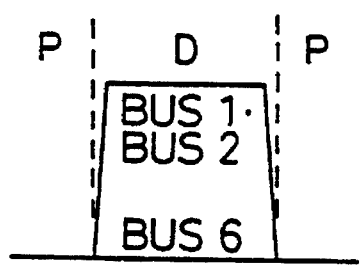
Figure 12F:
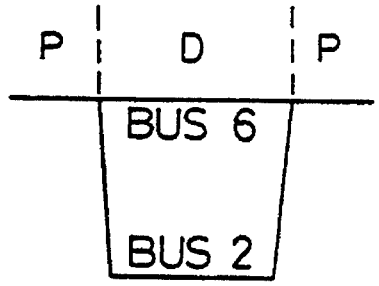
Figure 12G:
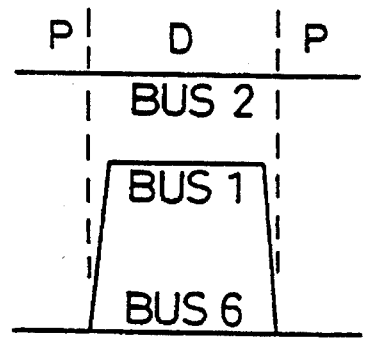

If the signal waveforms on the bus are the ones shown in FIGS. 12(d) and 12(f), on the other hand, the passive- or dominant-mode potential of the bus 1 changes in the opposite direction (or becomes lower than the potential of the bus 6). In order to set the passive-mode potential V4 of the bus 4 within the predetermined range, therefore, the passive potential detector section 21 must deliver the potential V1 of the bus 1 to the bias section 17. At this point of time, however, the potential V3a from the detector section 21 is higher than the potential V1 of the bus 1 by a forward potential VDa of the diode 21a. Actually, the bias section 17 applies the bias on the basis of the potential V3a (=(V1+ VDa)) from the passive potential detector section 21, so that the respective resistance values of the resistors 17c, 17d and 21b should be set in ratios such that the potential VDa is canceled.

The following is a description of the case of the bus 2, which may be regarded as similar to the case of the bus 1. If the signal waveforms on the bus are the ones shown in FIGS. 12(a), 12(b), 12(c), 12(d) and 12(f), the potential of the bus 2 cannot change in the opposite direction (or become higher than the potential of the bus 6) in the dominant mode and in a state of which the passive-mode potentials of the buses 2 and 6 are equal. Therefore, the passive potential detector section 21 delivers the potential V6 of the bus 6 as the potential V3b (see FIG. 8) to the bias section 18.

If the signal waveforms on the bus are the ones shown in FIGS. 12(e) and 12(g), on the other hand, the passive- or dominant-mode potential of the bus 2 changes in the opposite direction (or becomes higher than the potential of the bus 6). Thus, the passive potential detector section 21 delivers the potential V2 of the bus 2 to the bias section 18.

In this embodiment, therefore, the respective potentials V4 and V5 of the buses 4 and 5 connected to the buses 1 and 2, respectively, can be set within the predetermined range even though the respective potentials V1 and V2 change in the passive mode, and the signal waveforms on the buses 4 and 5 are crossed in the dominant mode. Thus, the reception comparator 19 can exhibit the changes of mode of the buses 1 and 2.

Figure 13:
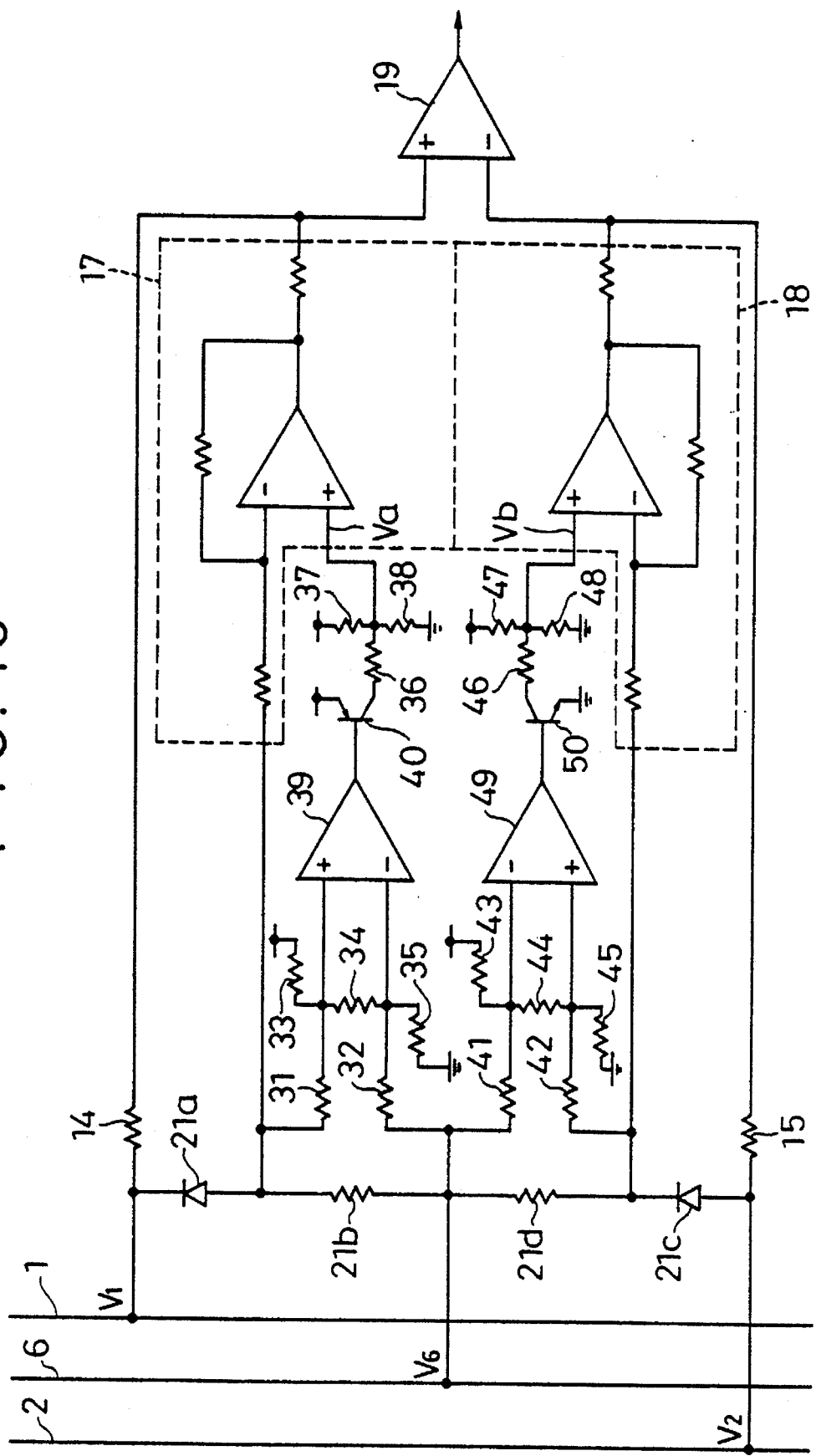
FIG. 13 is a circuit diagram illustrating an arrangement of a seventh embodiment of the receiver circuit.

FIG. 13 is a circuit diagram illustrating an arrangement of a seventh embodiment of the receiver circuit, in which three signal transmission lines are used. This receiver circuit is based on the same principle of operation of the second embodiment. Referring to FIG. 13, the passive potential, which normally is the potential V6 of the bus 6, may be the potential of the bus 1 or 2 according to circumstances. This embodiment differs from the second embodiment in the arrangement of the section for the generation of the respective input reference potentials Va and Vb of the bias sections 17 and 18. In this embodiment, this section is composed of resistors 31 to 38 and 41 to 48, comparators 39 and 49, and transistors 40 and 50. When the potentials of the buses change in the opposite direction (see FIGS. 12(d) to 12(g)), the input reference potentials Va and Vb are changed.

If the potential of the bus 1 is passive, that is, if it is lower than the potential of the bus 6, according to this embodiment, for example, a potential obtained by adding the voltage drop VDa in the diode 21a is delivered from the transistor 40 to the bias section 17. Thus, in this embodiment, the input reference potential Va is increased so as to cancel the voltage drop VDa.

Referring to FIG. 13, if the signal waveforms on the bus, in the circuit on the side of the bus 1, are the ones shown in FIGS. 12(a), 12(b), 12(c), 12(e) and 12(g), the input reference potential Va is determined depending on the resistors only, as in the case of the second embodiment. If the signal waveforms are the ones shown in FIGS. 12(d) and 12(f), however, the comparator 39 in the circuit on the side of the bus 1 detects this state, and the transistor 40 is turned on to raise the input reference potential Va. Thus, in this embodiment, the influence of the voltage drop VDa can be removed, and the variation of the ground offset of the individual multiplex nodes can be canceled.

Also in the circuit on the side of the bus 2, if the signal waveforms on the bus are the ones shown in FIGS. 12(a), 12(b), 12(c), 12(d) and 12(f), the input reference potential Vb is determined depending on the resistors only. If the signal waveforms are the ones shown in FIGS. 12(e) and 12(g), however, the comparator 49 in the circuit on the side of the bus 2 detects this state, and the transistor 50 is turned on to lower the input reference potential Vb.

In the case where the three signal transmission lines are used, the potential of the bus 6 undergoes no variation attributable to the mode change, so that the passive potential is equal to the potential V6 of the bus 6. If the bus potential is opposite (or if the signal waveforms are the ones shown in FIGS. 12(d) to 12(g)), however, the potential V6 of the bus 6 cannot be made passive. This is because if the bias is applied on the basis of the potential V6 of the bus 6 when the waveforms are the ones shown in FIGS. 12(d) and 12(f), for example, the potential V4 of the bus 4 becomes lower than the input reference potential Va, so that the potential V4 of the bus 4 cannot exceeds the potential V5 of the bus 5 even in the dominant mode. In order to solve this problem, a passive potential is used as the potential of the bus 1 in the circuit of FIG. 13. The present invention is not, however, limited to this arrangement. Alternatively, it is necessary only that the bus 1 be connected with a circuit which operates only when the potential V4 is lower than the input reference potential Va, that is, voltage restricting sections which restrict the voltage lest the potential V4 be lower than the input reference potential Va.

Figure 14:
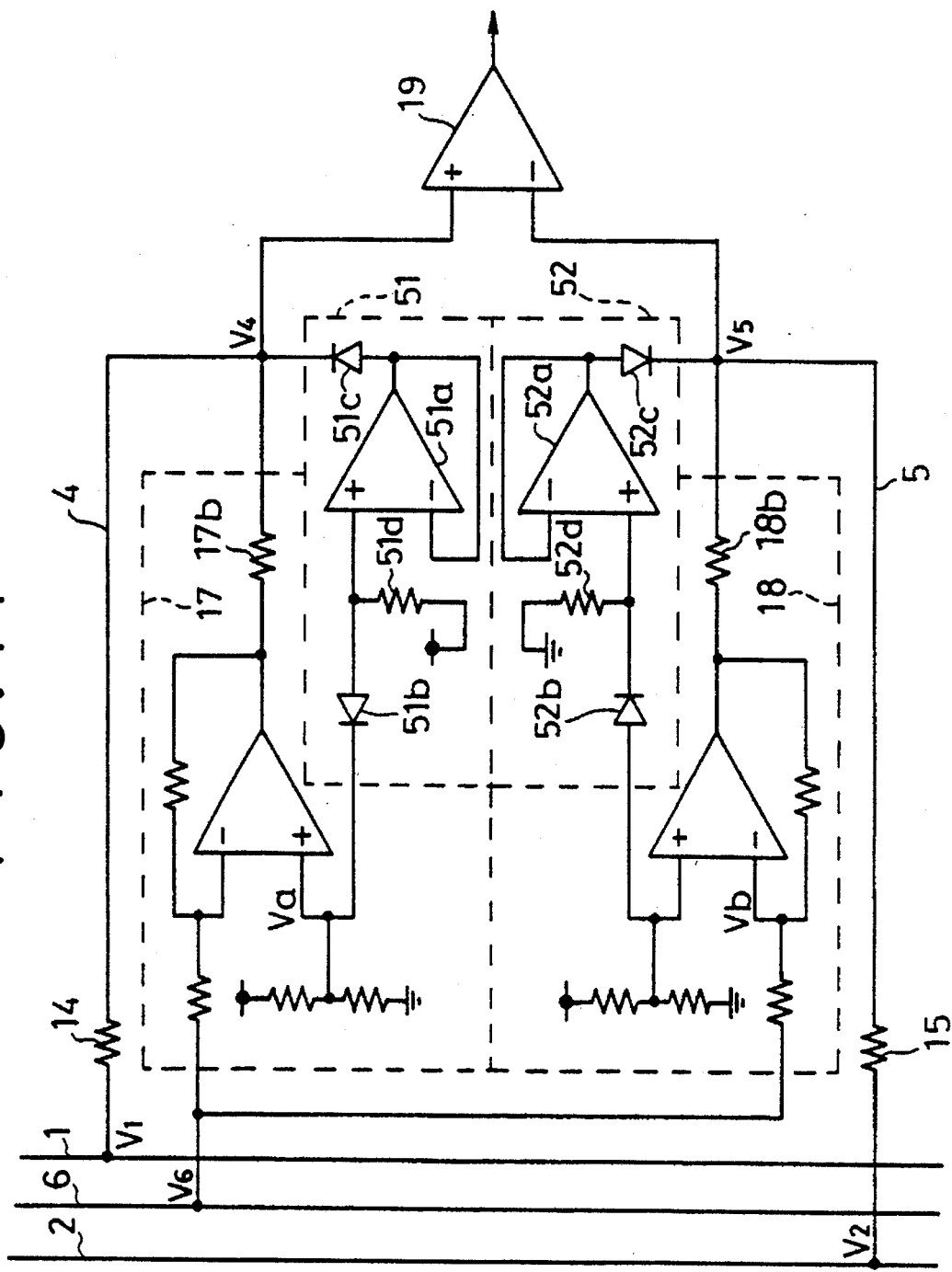
FIG. 14 is a circuit diagram illustrating an arrangement of an eighth embodiment of the receiver circuit.

FIG. 14 shows an example of the circuit which gives practical effect to the alternative method described above. Referring to FIG. 14, this receiver circuit comprises the bias sections 17 and 18 and voltage restricting sections 51 and 52. The voltage restricting section 51, which includes an operational amplifier 51a, diodes 51b and 51c, and a resistor 51d, restricts the voltage lest the potential V4 of the bus 4 be lower than the input reference potential Va. The voltage restricting section 52, which includes an operational amplifier 52a, diodes 52b and 52c, and a resistor 52d, restricts the voltage lest the potential V5 of the bus 5 be higher than the input reference potential Vb.

Figure 15:
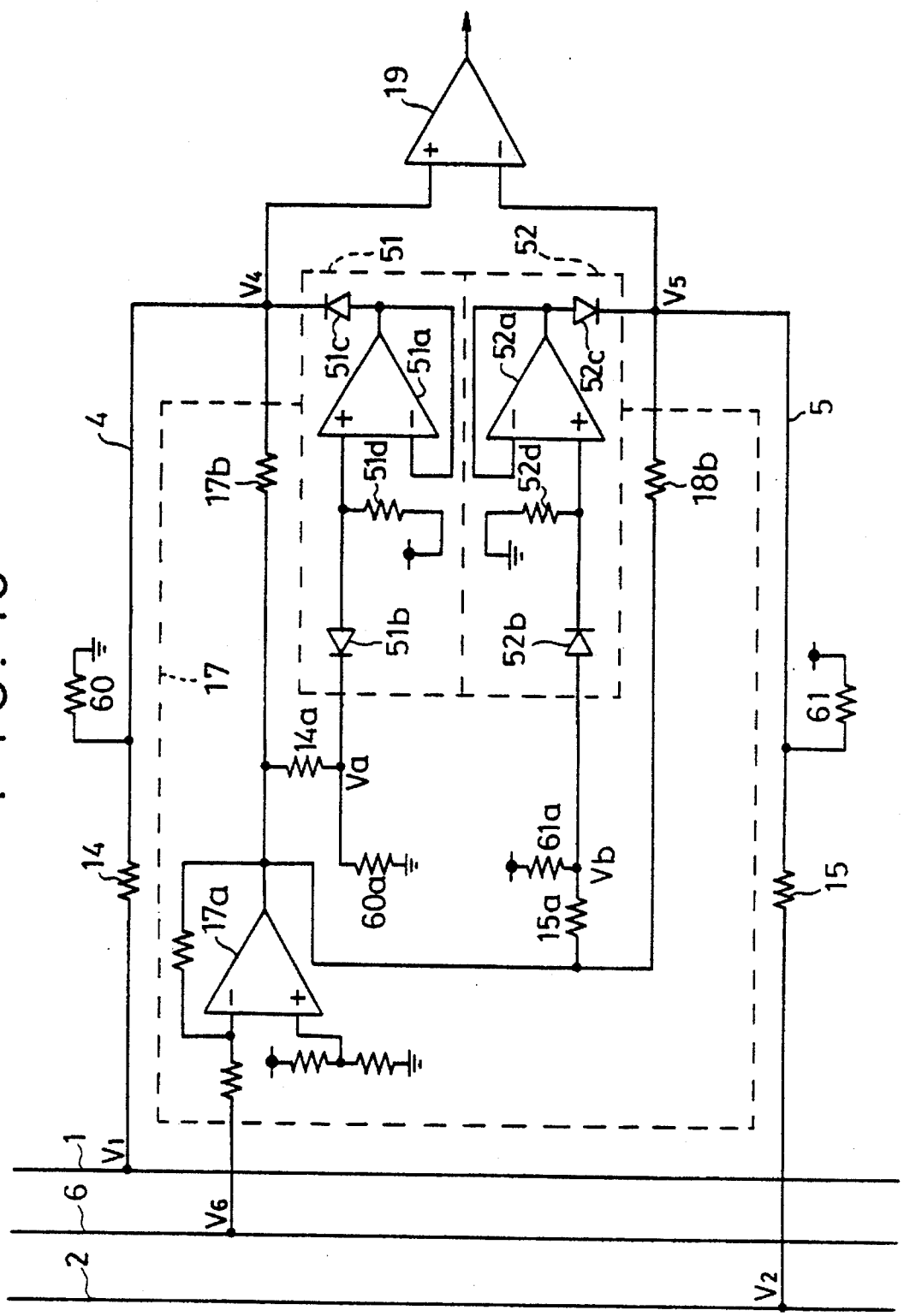
FIG. 15 is a circuit diagram illustrating an arrangement of a ninth embodiment of the receiver circuit.

Further, the bias sections may be reduced to one in number. FIG. 15 shows an embodiment for this case. Referring to FIG. 15, according to this embodiment, resistors 14a and 15a, which connect the output of the operational amplifier 17a of the bias section 17 and the diodes 51b and 52b, respectively, and resistors 60, 60a, 61 and 61a are additionally used. In this case, if the resistors 17b, 14a, 18b and 15a have the same resistance value, and if the resistors 60, 60a, 61 and 61a have the same resistance value, the passive potentials Va and Vb are equal to those of the buses 4 and 5 as input lines.

The following is a detailed description of these circumstances.

According to this embodiment, the potential of the positive input terminal of the operational amplifier 51a, in the circuit on the side of the bus 1, is a potential obtained by adding the input reference potential Va and a forward voltage VDb of the diode 51b. Since the output potential of the amplifier 51a serves to make the respective potentials of its positive and negative input terminals, moreover, it is equal to (Va+VDb). If the diodes 51b and 51c are the same kind, the forward potential of the diode 51c is, therefore, equal to VDb. The diode allows no electric current to flow unless a potential difference not smaller than the value of the forward potential VDb is produced. If the potential V4 of the bus 4 is not lower than (Va+VDb−VDb)=Va, therefore, no current flows through the diode 51c. Thus, the voltage restricting section 51 can prevent the potential V4 from becoming lower than the input reference potential Va. Also, the section 51 can cancel variations of the forward voltages of the diodes caused by the influence of temperature.

Also in the circuit on the side of the bus 2, the voltage restricting section 52 acts lest the potential V5 of the bus 5 be higher than the input reference potential Vb. Thus, the signal waveforms shown in FIGS. 12(d) and 12(e) change into the waveforms on the buses 4 and 5 shown in FIGS. 11(e) and 11(f), respectively, and the reception comparator 19 can exhibit the passive or dominant mode.

Thus, in the receiver circuit according to the present embodiment, the input waveforms of the comparator can be set within a predetermined potential range without regard to the variations of the potentials of the signal transmission lines, if the passive mode (state without signals) and the dominant mode (state with signals) are established on the transmission lines. In this receiver circuit, moreover, the input waveforms are crossed at the points of change of the mode of the signal transmission lines. Accordingly, in the receiver circuit of this embodiment, the data signals can be normally received even in case of failure of the transmission lines. Since this receiver circuit, unlike the conventional one, is not designed for switching receiver signals, moreover, its configuration is simple. Furthermore, this receiver circuit can receive the data signals without regard to the state, normal or abnormal, of the signal transmission lines, even under unfavorable conditions or influences of an automobile which causes ground potential differences between the multiplex nodes, for example. According to this embodiment, therefore, the efficiency of data transmission can be improved.

The following is a description of the terminal circuits 3 and 7 and the transmitter circuit 12 of the multiplex node of the multiplex transmission system shown in FIG. 1.

Figure 16:
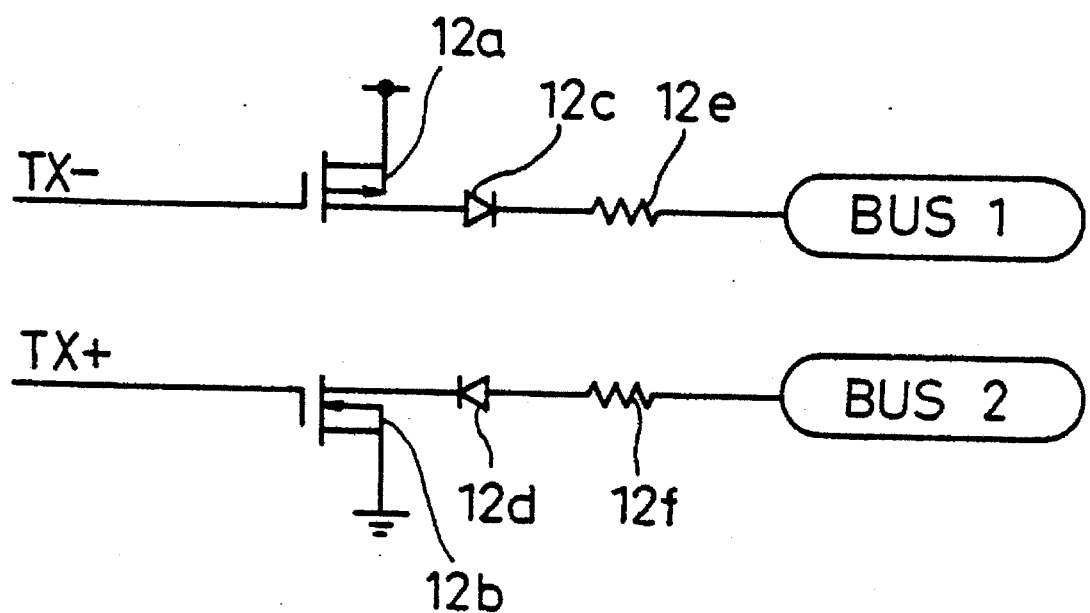
FIG. 16 is a circuit diagram illustrating an arrangement of an embodiment of a transmitter circuit shown in FIG. 1.

The terminal circuits 3 and 7 are generally constructed in the manner shown in FIG. 4, while the transmitter circuit 12 is arranged as shown in FIG. 16. The transmitter circuit 12 shown in FIG. 16 comprises filed-effect transistors (hereinafter referred to as FETs) 12a and 12b for use as drivers, diodes 12c and 12d for protecting the FETs 12a and 12b, and resistors 12e and 12f. The FETs 12a and 12b are suited for high-speed data transmission. The buses 1 and 2 are connected with the P- and N-channel FETs 12a and 12b, respectively, and perform balanced transmission. Symbols TX+ and TX− designate the respective inputs of FET gates. If the multiplex transmission lines are two in number, the signal waveforms on the normal bus for the balanced transmission behave in the manner shown in FIG. 11(a).

Figure 17A:
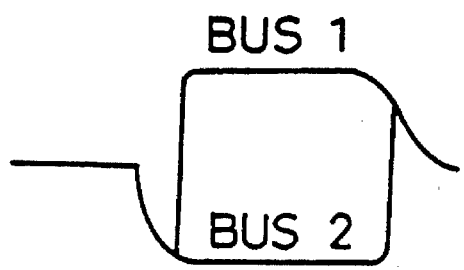
FIGS. 17(a)–(h) show diagrams illustrating data signal waveforms on the buses obtained with of the transmitter circuit shown in FIG. 16.
Figure 17B:
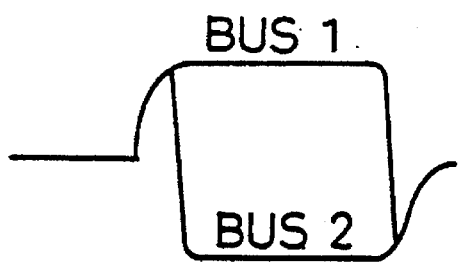
Figure 17C:
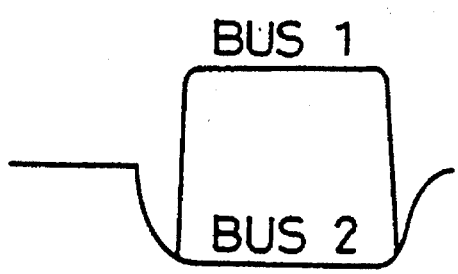
Figure 17D:
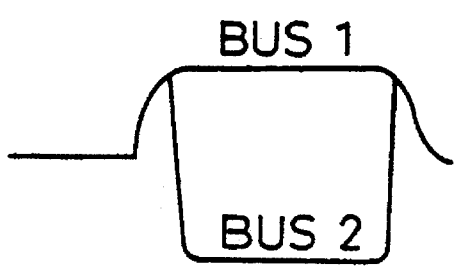
Figure 17E:
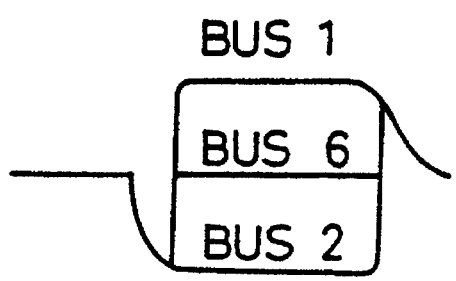
Figure 17F:
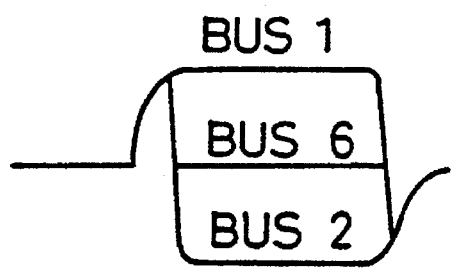
Figure 17G:
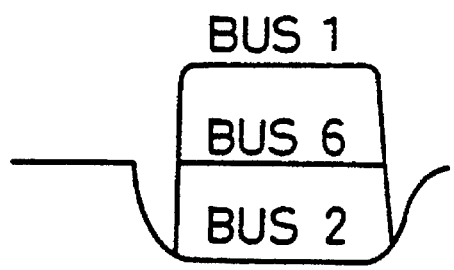
Figure 17H:
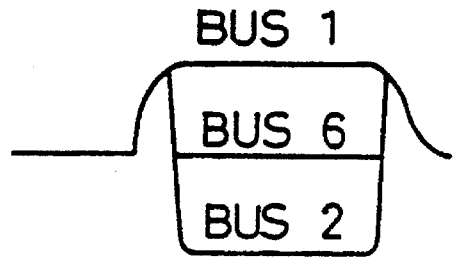

None of the P and N channels of the FETs 12a and 12b are quite equal in switching characteristic, ON resistance, etc. Moreover, actual signal waveforms are not similar to the square waveform shown in FIG. 11(a), and are distorted unstable waveforms, such as the ones shown in FIGS. 17(a) to 17(d). FIG. 17(a) shows a waveform which is indicative of the case that the N-channel FET 12b is turned on and off earlier. More specifically, this waveform is pulled toward the N channel, which is switched earlier, when the FET is turned on, and toward the P channel, which is switched later, when the FET is turned off. FIG. 17(b) shows a waveform which is indicative of the case that the P-channel FET 12a is turned on and off earlier. FIG. 17(c) shows a waveform which is indicative of the case that the N-channel FET 12b is turned on earlier and the P-channel FET 12a is turned off earlier. FIG. 17(d) shows a waveform which is indicative of the case that the P-channel FET 12a is turned on earlier and the N-channel FET 12b is turned off earlier. FIGS. 17(e) to 17(h) show similar signal waveforms for the case of three multiplex transmission lines.

In such an unstable state, failure of data transmission or radiation of radio noises may be caused, so that these waveforms should be shaped up.

In order to shape up the waveforms, according to the present invention, there is provided the multiplex transmission system in which a filter, formed of a capacitor or coil, is connected to the terminal circuits 3 and 7 or the transmitter circuit 12.

FIGS. 18(a)–(e) show circuit diagrams illustrating several embodiments of the terminal circuits for waveform shaping according to the present invention. Since the terminal circuits 3 and 7 are constructed in like manner, only the circuit 3 will be described below.

Figure 18A:
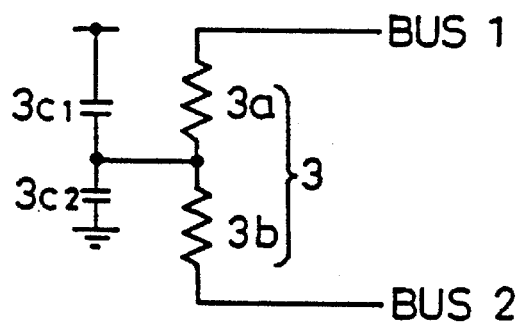
FIGS. 18(a)–(e) show circuit diagrams illustrating the respective arrangements of various embodiments of a terminal circuit shown in FIG. 1.

FIG. 18(a) is a circuit diagram illustrating an example of the terminal circuit 3 which uses two multiplex transmission lines. Referring to FIG. 18(a), the terminal circuit 3 is composed of terminal resistors 3a and 3b of the same resistance value. Capacitors 3c1 and 3c2 are connected to the middle point between the resistors 3a and 3b. Thus, in this embodiment, a switching delay can be absorbed by the capacities of the capacitors so that the signals waveforms on the buses 1 and 2 can retain their shapes even though the leading and trailing edges of the waveforms on the buses are not completely coincident.

Figure 18B:
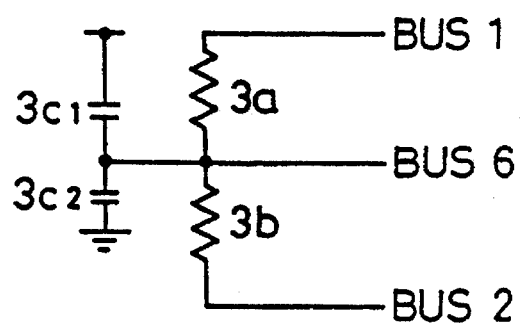

FIG. 18(b) is a circuit diagram illustrating another example of the terminal circuit 3 which uses three multiplex transmission lines. Referring to FIG. 18(b), the capacitors 3c1 and 3c2 are connected to the middle point between the terminal resistors 3a and 3b in the terminal circuit 3, as in the arrangement shown in FIG. 18(a).

Figure 18C:
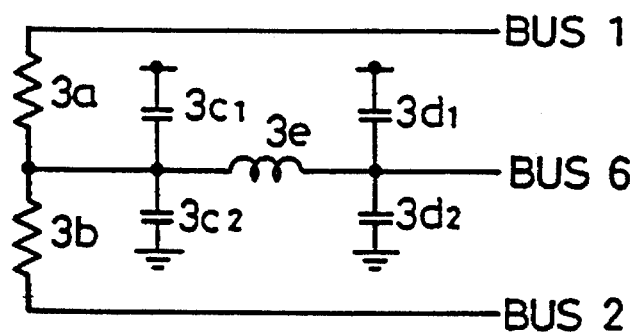

FIG. 18(c) is a circuit diagram illustrating still another example of the terminal circuit 3 which also uses three multiplex transmission lines. Referring to FIG. 18(c), the terminal circuit 3 is arranged so that capacitors 3c1, 3c2, 3d1 and 3d2 and a coil 3e are connected to the bus 6. Thus, in this embodiment, the capacitors 3c1, 3c2, 3d1 and 3d2 and the coil 3e can serve as filter means for restraining high-frequency noises from the bus 6.

Figure 18D:
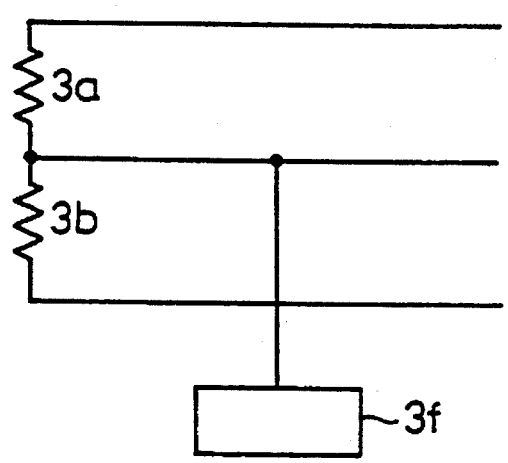
Figure 18E:
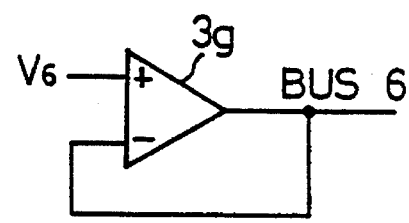

FIG. 18(d) is a circuit diagram illustrating a further example of the terminal circuit 3 which also uses three multiplex transmission lines. Referring to FIG. 18(d), the terminal circuit 3 is arranged so that a power supply unit 3f and the like are connected to the bus 6. According to this embodiment, the potential of the bus 6 is kept within a fixed range by means of the power supply unit 3f, so that the noises from the bus 6 can be restrained. FIG. 18(e) shows an operational amplifier 3g as an example of the power supply unit 3f. Thus, in this embodiment, the potential of the bus 6 can be kept within the fixed range. In this case, the amplifier 3g serves to keep its output potential at V6 in a manner such that the potential V6 of the bus 6 is fetched to its positive input, and its negative input is connected to its output.

FIGS. 19(a) to 22(c) show circuit diagrams illustrating several embodiments of the transmitter circuit according to the present invention.

Figure 19A:
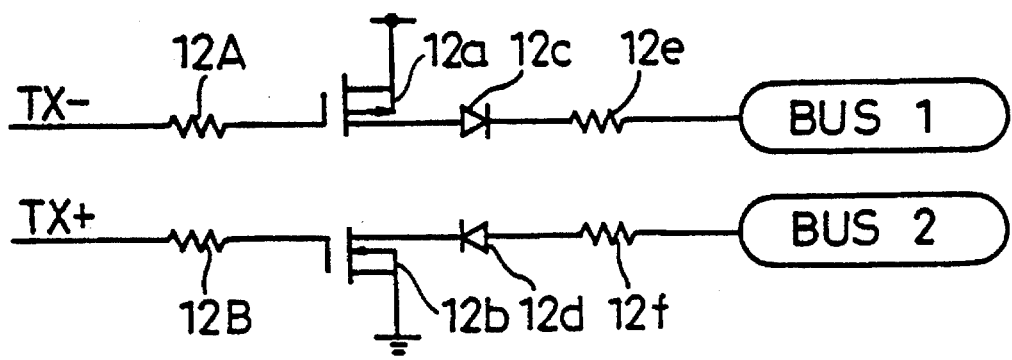
FIGS. 19(a)–(c) show circuit diagrams illustrating the respective arrangements of alternative embodiments of the transmitter circuit.

FIG. 19(a) illustrates an embodiment in which resistors 12A and 12B are connected to the gates of the FETs 12a and 12b, respectively, of the transmitter circuit shown in FIG. 16. Thus, in this embodiment, the switching time for the FETs 12a and 12b can be adjusted by means of the resistors 12A and 12B. More specifically, in this arrangement, a delay circuit is formed by utilizing the respective input capacities of the gates of the FETs 12a and 12b and additionally using the resistors 12A and 12B. This embodiment can be utilized for the waveforms shown in FIGS. 17(a), 17(b), 17(e) and 17(f). If one of the FETs is turned on and off earlier than the other, the switching speed is lowered by connecting the resistor to the FET of the higher switching speed. Thus, in this embodiment, the P- and N-channel FETs are switched with the same timing, so that the signal waveforms on the buses can be shaped up. In this embodiment, moreover, a CR circuit is formed by connecting the resistors 12A and 12B, so that the leading and trailing edges of the signal waveforms can be made gently-sloping. Thus, some switching delay can be ignored, so that the radiation of radio noises can be restrained. The difference between the respective ON resistances of the FETs 12a and 12b can be adjusted by means of the resistors 12e and 12f.

Figure 19B:
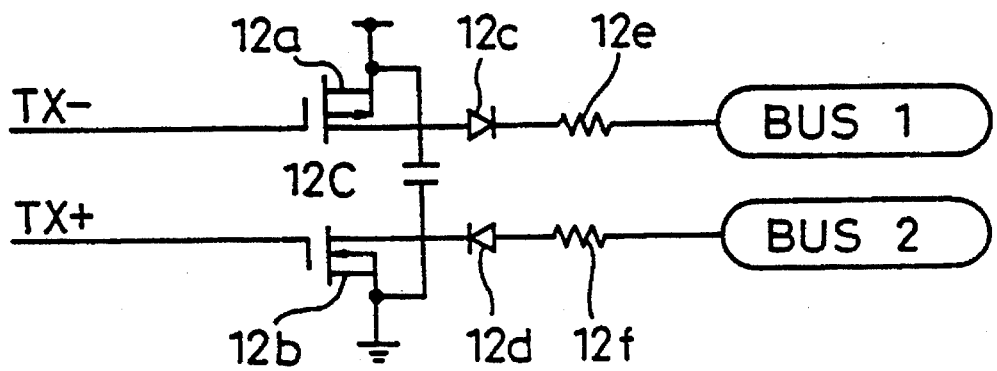

FIG. 19(b) illustrates an embodiment in which a capacitor 12C is connected between the respective sources of the FETs 12a and 12b. Thus, according to this embodiment, the power supply is restrained from shaking at the time of on-off operation, and the signal waveforms on the buses can be can be shaped up.

Figure 19C:
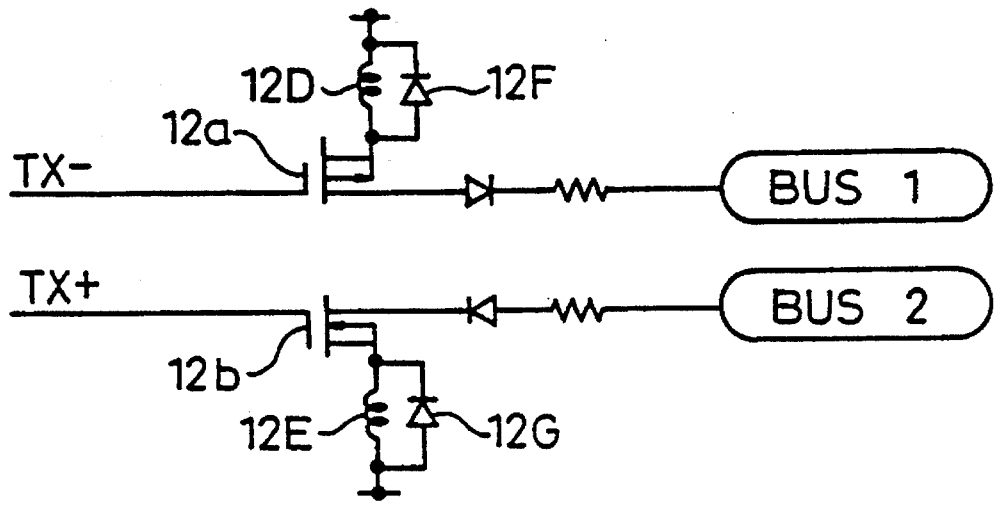

FIG. 19(c) illustrates an embodiment in which coils 12D and 12E are connected to the sources of the FETs 12a 12b, respectively. Thus, according to this embodiment, the on-state rush current can be restrained to make the leading edge gentle-sloping, so that the switching delay between the P and N channels can be absorbed. Also, frequency-component noises at the leading edge can be removed, so that the radiation of radio noises can be restrained. Diodes 12F and 12G, which are connected in parallel with the coils 12D and 12E, respectively, serve to prevent production of reverse starting voltages in the coils when the FETs 12a and 12b are turned off.

Figure 20A:
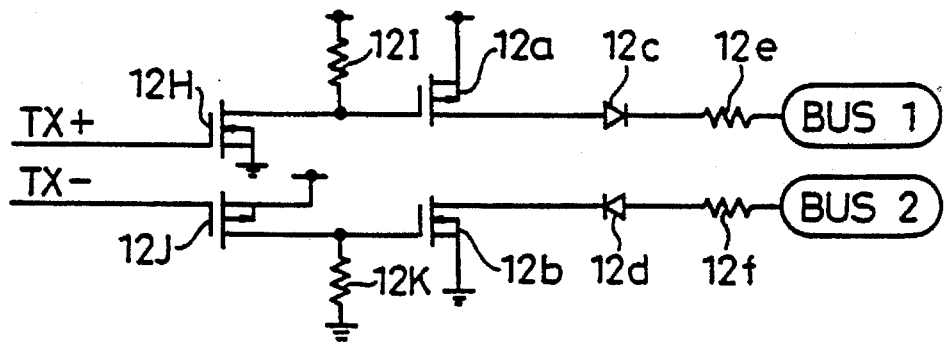
FIGS. 20(a)–(d) show circuit diagrams illustrating the respective arrangements of further embodiments of the transmitter circuit.

FIG. 20(a) illustrates an embodiment in which an N-channel FET 12H and a resistor 12I are connected to the gate side of the P-channel FET 12a, and a P-channel FET 12J and a resistor 12K are connected to the gate side of the N-channel FET 12b. Thus, according to this embodiment, the switching delay between the P and N channels can be canceled. More specifically, in this embodiment, the P-channel FETs 12a and 12J, which are identical elements of one type, and the N-channel FETs 12b and 12H, which are identical elements of another type, are combined with one another. In this embodiment, therefore, the timing for the leading and trailing edges of the P and N channels, which is irregular as shown in FIGS. 17(c), 17(d), 17(g) and 17(h), can be regularized when the data are outputted.

If the times required for the FETs 12a, 12b, 12H and 12J to be turned on are ta, tb, tH and tJ, respectively, and if the times required for these FETs to be turned off are Ta, Tb, TH and TJ, respectively, the times t1 and T1 required before the waveform on the bus 1 is switched on and off are t1=tH+ta and T1=TH+Ta, respectively, and the times t2 and T2 required before the waveform on the bus 2 is switched on and off are t2=tJ+tb and T2=TJ+Tb, respectively. Since ta=tJ, tb=tH, Ta=Tj, and Tb=TH are given, t1=t2 and T1=T2 are obtained. According to this embodiment, as seen from these equations, the timing can be regularized when the data are outputted.

Figure 20B:
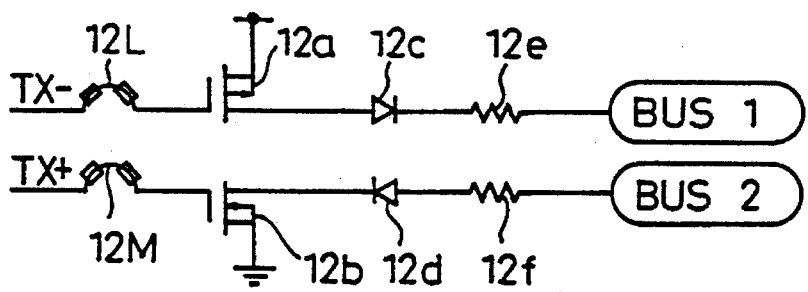
Figure 20C:
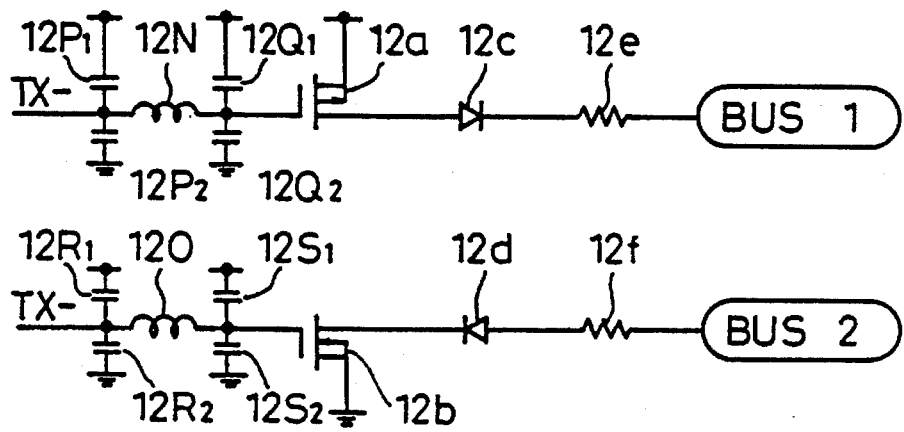

FIGS. 20(b) and 20(c) illustrate embodiments in which filter means is connected to the gate side of the FETs 12a and 12b. Thus, in these embodiments, noises from the respective gates of the FETs 12a and 12b and the leading edges of the waveforms can be restrained. The filter means of FIG. 20(b) is composed of ferrite beads 12L and 12M, while the filter means of FIG. 20(c) are composed of coils 12N and 12O and capacitors 12P1, 12Q1, 12P2, 12Q2, 12R1, 12S1, 12R2 and 12S2.

Figure 20D:
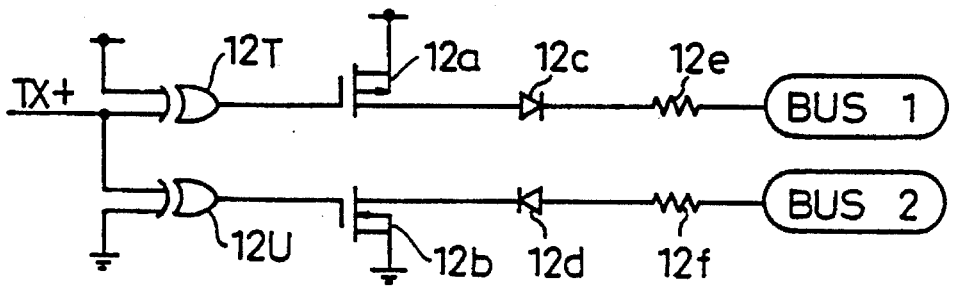

FIG. 20(d) illustrates an embodiment in which exclusive OR circuits (hereinafter referred to as XORs) 12T and 12U are connected to the gate side of the FETs 12a and 12b. Thus, this embodiment is effective when the inputs TX+ and TX− of the FET gates cannot be synchronously switched. When the input of the one XOR is at high level, an inverted version of the input of the other XOR is outputted. When the input of the one XOR is at low level, on the other hand, the input state of the other XOR is outputted. If the XORs 12T and 12U are logical elements of the same type, the respective gate input waveforms of the FETs 12a and 12b share the same timing.

Figure 21A:
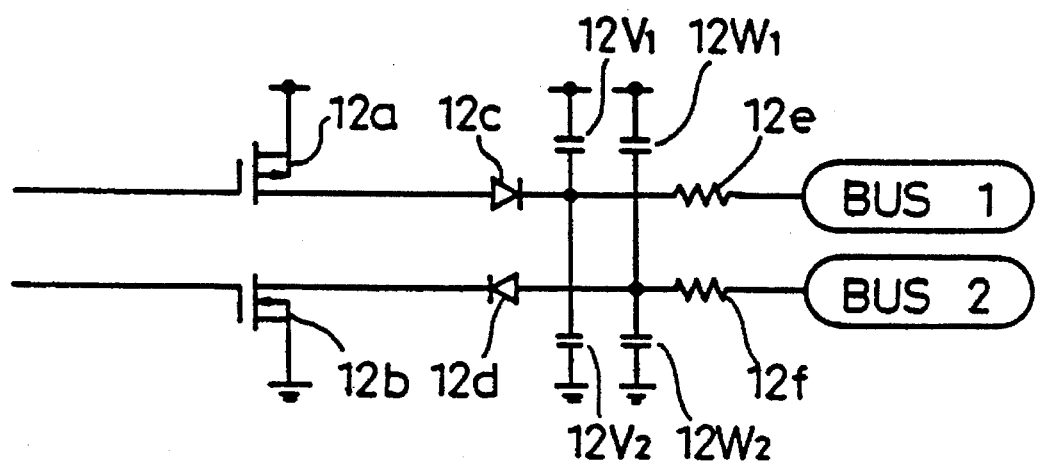
FIGS. 21(a)–(c) show circuit diagrams illustrating the respective arrangements of further embodiments of the transmitter circuit.
Figure 21B:
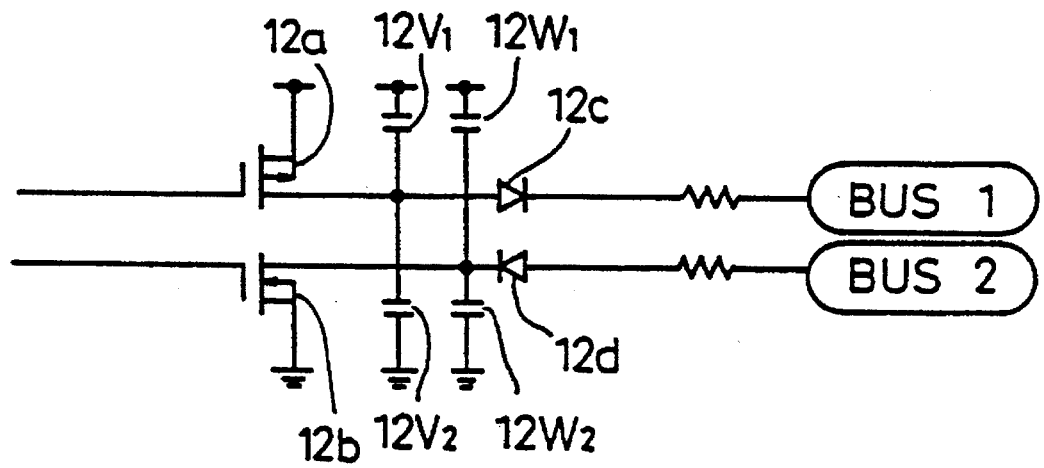

FIGS. 21(a) and 21(b) illustrate embodiments in which a CR circuit is formed by connecting capacitors 12V1, 12V2, 12W1 and 12W2 between the diodes 12c and 12d and the resistors 12e and 12f or between the FETs 12a and 12b and the diodes 12c and 12d. Thus, according to these embodiments, the on-off operation of the FETs 12a and 12b can be blunted. The difference between the embodiments of FIGS. 21(a) and 21(b) lies in that the capacity between the transmission lines cannot be increased in the arrangement of FIG. 21(b). Referring to FIG. 21(b), according to this embodiment, the capacitors 12V1 and 12V2 are connected between the FET 12a and the diode 12c, while the capacitors 12W1 and 12W2 are connected between the FET 12b and the diode 12d. Thus connected to the transmission nodes, these capacitors are operative only during transmission. This is because the bus signal waveforms transmitted from other nodes during reception are prevented from reaching the capacitors 12V1, 12V2, 12W1 and 12W2 by the diodes 12c and 12d.

Figure 21C:
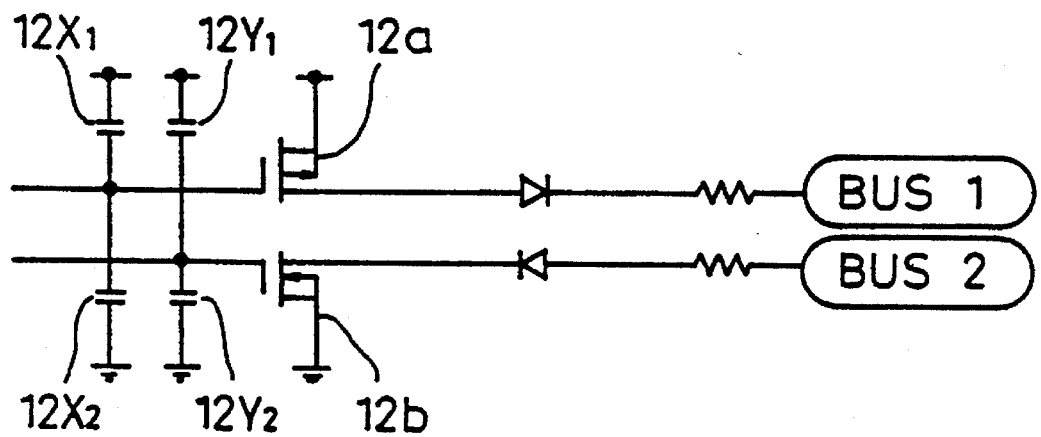

FIG. 21(c) illustrates an embodiment in which capacitors 12X1, 12X2, 12Y1 and 12Y2 are connected to the gate side of the FETs 12a and 12b. Thus, according to this embodiment, the signal waveforms from the FET gates are blunted so that the frequency component at the leading edge is removed. In this embodiment, moreover, the timing for the rise and fall of the FETs 12a and 12b can be regulated by adjusting the respective capacitance values of the capacitors 12X1, 12X2, 12Y1 and 12Y2.

Figure 22A:
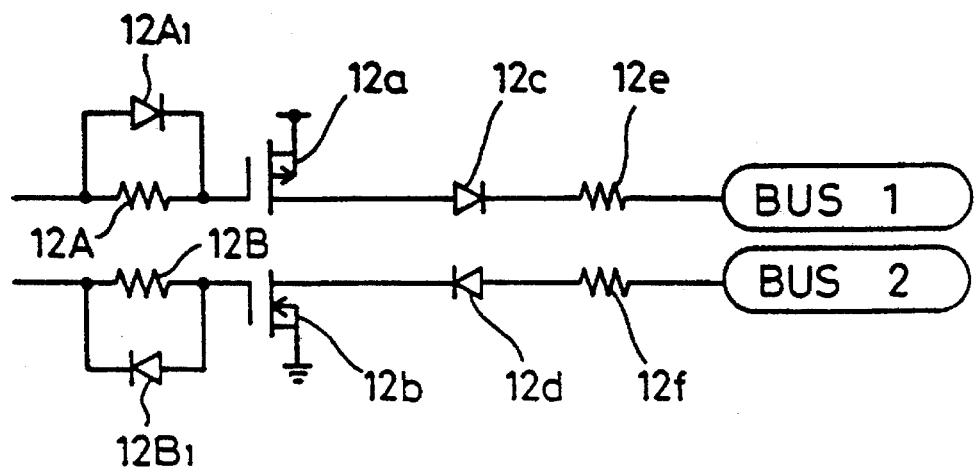
FIGS. 22(a)–(c) show circuit diagrams illustrating the respective arrangements of further embodiments of the transmitter circuit.
Figure 24A:
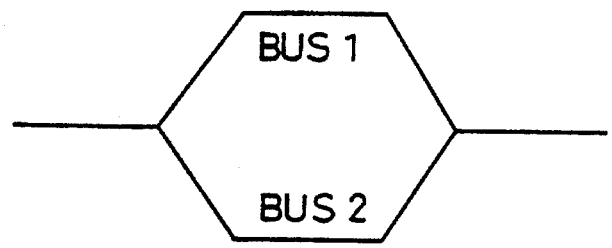
FIGS. 24(a)–(d) show diagrams illustrating data signal waveforms on the buses obtained with of the transmitter circuits and terminal circuits shown in FIG. 22 and 23.
Figure 24B:
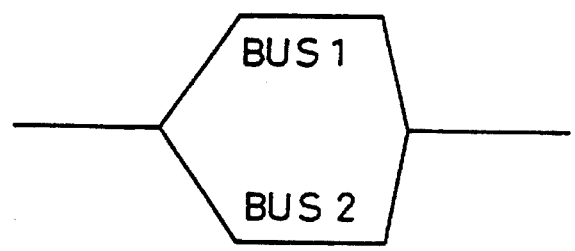

FIG. 22(a) illustrates an embodiment in which diodes 12A1 and 12B1 are connected in parallel with the gate resistors 12A and 12B of the circuit shown in FIG. 19(a). Thus, according to this embodiment, the fall of each signal waveform can be made faster than that of the signal waveforms (see FIG. 24(a)) on the buses 1 and 2 shown in FIG. 19(a), so that the signal delay can be reduced, as shown in FIG. 24(b). If the leading and trailing edges of the bus signal waveforms are switched with the same timing, more noises are produced when the current flows, that is, at the leading edges of the signal waveforms, and less at the trailing edges. Thus, according to this embodiment, the leading edges of the signal waveforms are made gently-sloping, and the delay of the trailing edges is reduced, so that the transmission speed can be increased.

Figure 22B:
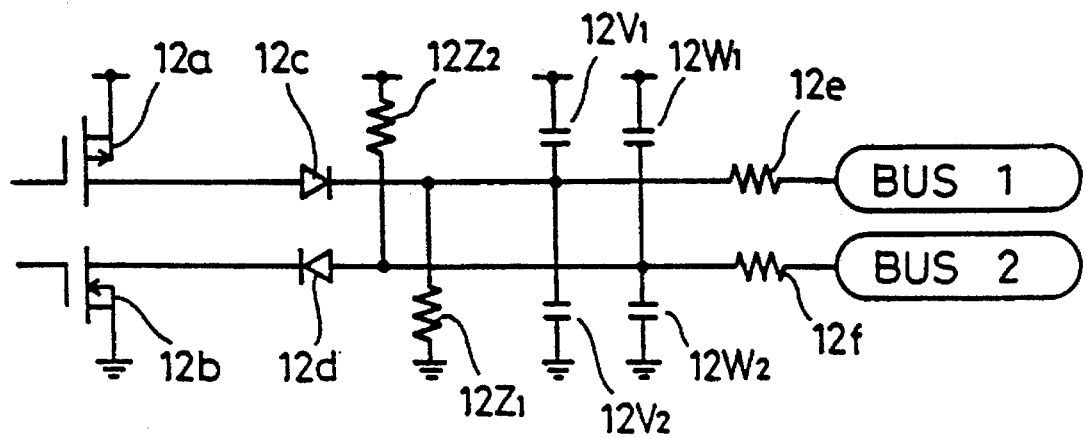
Figure 22C:
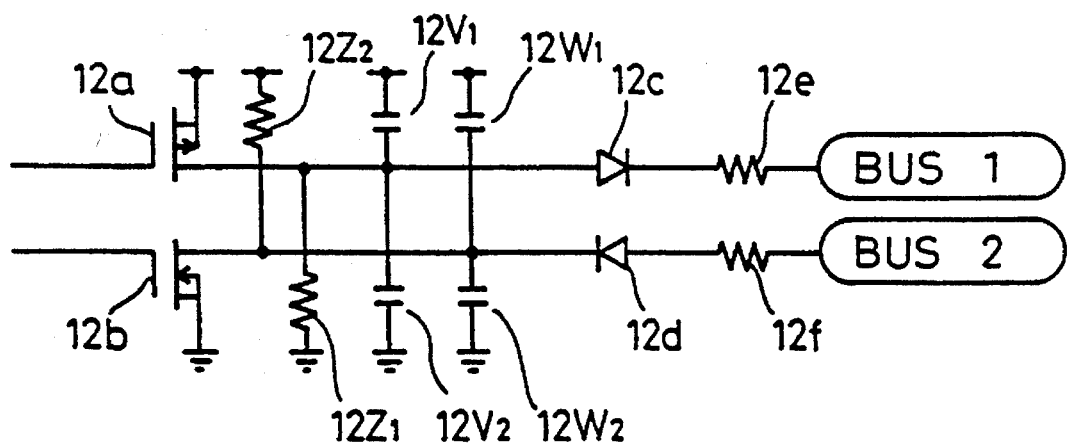

FIGS. 22(b) and 22(c) illustrate embodiments in which resistors 12Z1 and 12Z2 are connected between the diodes 12c and 12d and the resistors 12e and 12f or between the FETs 12a and 12b and the diodes 12c and 12d of the circuit shown in FIGS. 21(a) and 21(b). Thus, according to these embodiments, the fall of the bus signal waveforms can be quickened.

Figure 23A:
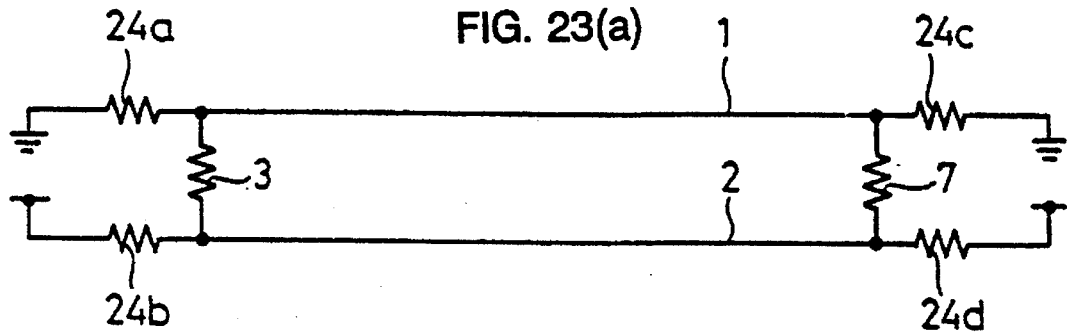
FIGS. 23(a)–(d) show circuit diagrams illustrating the respective arrangements of alternative embodiments of the terminal circuit.
Figure 23B:
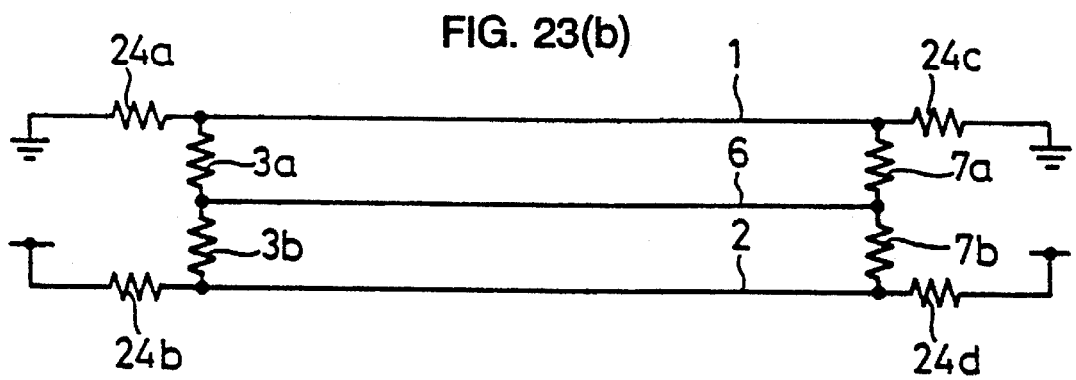

FIGS. 23(a) and 23(b) illustrate embodiments in which bias resistors 24a, 24b, 24c and 24d are connected across the terminal circuits 3 and 7 in a network including two or more multiplex transmission lines. Thus, according to these embodiments, if either of the terminal circuits is disengaged from the bus, thereby producing reflected waves, the influence of the waves can be removed to enable normal reception. FIG. 23(a) is a circuit diagram illustrating a two-bus arrangement, and FIG. 23(b) is a circuit diagram illustrating a three-bus arrangement.

Figure 24C:
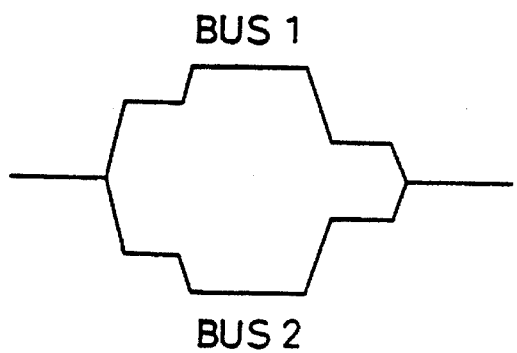
Figure 24D:
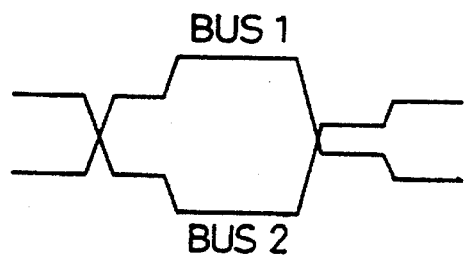

More specifically, if one of the terminal circuits is disengaged, reflected waves are produced, resulting in a delay at the trailing edge of each signal waveform, as shown in FIG. 24(c). Bias voltage is applied across the bias resistors 24a and 24d in a manner such that the resistors on the side of the bus 1 is connected to the ground and the resistors on the side of the bus 2 to Vcc. Even though the reflected waves are generated, therefore, their influence can be removed, as shown in FIG. 24(d). Thus, the receiver circuit can normally receive data signals.

Figure 23C:
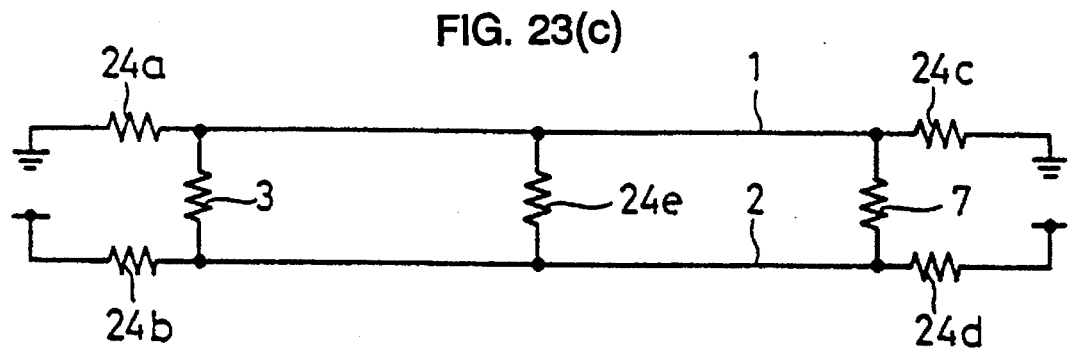
Figure 23D:
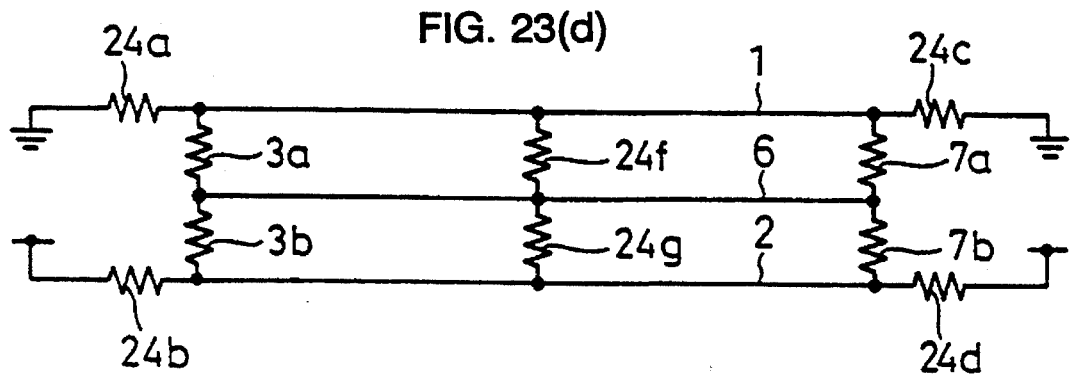

FIGS. 23(c) and 23(d) illustrate embodiments in which resistors 24e, 24f and 24g are connected between and near the middle of the buses. Thus, according to these embodiments, the impedance between the buses can be lowered, and the influence of the reflected waves can be removed. FIG. 23(c) is a circuit diagram illustrating a two-bus arrangement, and FIG. 23(d) is a circuit diagram illustrating a three-bus arrangement.

According to the present invention, moreover, the terminal circuits shown in FIGS. 18(a)–18(e) and the transmitter circuits of the embodiments shown in FIGS. 19(a) to 23(d) may be used in combination with one another. Also, the receiver circuits of the various embodiments may be used in combination. Further, transistors may be used in place of the FETs 12a and 12b according to the embodiments described herein.

Although the bus-type configurations have been described in connection with the embodiments shown in FIGS. 23(a)–23(d), the present invention is not limited to this type, and may be also applied to loop-type configurations.

What is claimed is:

1. A multiplex transmission system including at least two multiplex nodes interconnected by two signal transmission lines for data transmission among the multiplex nodes, comprising:

two terminal circuits individually connected to the signal transmission lines at respective ends thereof, and having two resistance elements and at least one capacitor, for stabilizing transmission waveforms, said two resistance elements being connected in series between the ends of the signal transmission lines, and said at least one capacitor being connected between a junction of said resistance elements and ground potential;

each of the multiplex nodes including a transmitter circuit and a receiver circuit, each connected to the signal transmission lines, for respectively transmitting data to and receiving data from other multiplex nodes; and each of the receiver circuits comprising:
a reception comparator for receiving data transmitted to the signal transmission lines;
attenuating resistors for attenuating potentials of the signal transmission lines to a level falling within a reception potential range of the reception comparator;
passive potential detecting means, including two passive potential detecting resistors connected to the signal transmission lines for detecting an intermediate potential of the signal transmission lines as a potential representing a passive state of the signal transmission lines wherein the signal transmission lines are not driven by the transmitter circuit, said passive potential detecting means having an output point at a junction between each of the two passive potential detecting resistors and a corresponding signal transmission line; and bias means for applying an analog bias to input lines of the reception comparator in accordance with an output from the passive potential detecting means, such that input potentials to the reception comparator fall within the reception potential range of the reception comparator, regardless of potential change of the signal transmission lines.

2. The multiplex transmission system according to claim 1, further comprising:

means for setting an input potential of an input line of the reception comparator connected to one of the signal transmission lines to a level lower than an input potential of an input line of the reception comparator connected to the other of the signal transmission lines, when the signal transmission lines are in the passive state wherein the signal transmission lines are not driven by the transmitter circuit; and means for setting the input potential of the input line of the reception comparator connected to said one of the signal transmission lines to a level higher than the input potential of the input line of the reception comparator connected to the other of the signal transmission lines when the signal transmission lines are in a dominant state wherein the signal transmission lines are driven by the transmitter circuit.

3. A multiplex transmission system including at least two multiplex nodes interconnected by two signal transmission lines for data transmission among the multiplex nodes, comprising:

two terminal circuits individually connected to the signal transmission lines at respective ends thereof, and having two resistance elements and at least one capacitor, for stabilizing transmission waveforms, said two resistance elements being connection in series between the ends of the signal transmission lines, and said at least one capacitor being connection between a junction of said resistance elements and ground potential;

each of the multiplex nodes including a transmitter circuit and a receiver circuit, each connected to the signal transmission lines, for respectively transmitting data to and receiving data from other multiplex nodes; and each of the transmitter circuits including at least one capacitor and inductor for suppressing noise produced on the signal transmission lines due to a steep edge component of a pulse and an unbalanced switching speed of the transmitter circuit when the signal transmission lines are driven by the transmitter circuit.

4. The multiplex transmission system according to claim 3, wherein the terminal circuits each have a first resistor connecting one of the signal transmission lines to the ground, and a second resistor connecting the other of the signal transmission lines to a power supply, for eliminating an influence of produced reflected waves.

5. The multiplex transmission system according to claim 4, wherein the terminal circuits further comprise a third resistor connecting intermediate portions of the signal transmission lines to each other, for lowering the impedance of the signal transmission lines and further eliminating the influence of produced reflected waves.

6. A multiplex transmission system including at least two multiplex nodes interconnected by first, second and third signal transmission lines for data transmission among the multiplex nodes, comprising:

terminal circuits each including two resistance elements connected to the signal transmission lines at respective ends thereof, and at least one capacitor, for stabilizing transmission waveforms, one of said two resistance elements being connected to the first and third signal transmission lines, the other of said two resistance elements being connected to the second and third transmission lines, and said at least one capacitor being connected between a junction of said third transmission line said resistance elements and ground potential;

each of the multiplex nodes including a transmitter circuit and a receiver circuit, each connected to the first, second and third signal transmission lines, for respectively transmitting data to and receiving data from other multiplex nodes; and each of the receiver circuits comprising:

a reception comparator for receiving data transmitted to the first and second signal transmission lines;

resistors for attenuating potentials of the first and second signal transmission lines to a level falling within a reception potential range of the reception comparator; and bias means for applying an analog bias to input lines of the reception comparator in accordance with a potential of the third signal transmission line, such that input potentials of the reception comparator fall within the reception potential range, regardless of potential change of the first and second signal transmission lines.

7. The multiplex transmission system according to claim 6, further comprising:

means for setting an input potential of an input line of the reception comparator connected to the first signal transmission line to a level lower than an input potential of an input line of the reception comparator connected to the second signal transmission line, when the signal transmission lines are in a passive state in which the signal transmission lines are not driven by the transmitter circuit; and means for setting the input potential of the input line of the reception comparator connected to the first signal transmission line to a level higher than the input potential of the input line of the reception comparator connected to the second signal transmission line, when the signal transmission lines are in a dominant state in which the signal transmission lines are driven by the transmitter circuit.

8. The multiplex transmission system according to claim 7, wherein the receiver circuits further comprise voltage restricting means for preventing the potential of the input line of the reception comparator from dropping below a predetermined potential, and for preventing the potential of the input line of the reception comparator from rising above a predetermined potential.

9. The multiplex transmission system according to claim 6, wherein each of the transmitter circuits includes at least one capacitor and at least one inductor, for suppressing noise produced on the signal transmission lines due to a steep edge component of a pulse and an unbalanced switching speed of the transmitter circuit when the signal transmission lines are driven by the transmitter circuit.

10. The multiplex transmission system according to claim 9, wherein the terminal circuits each have a first resistor connecting the first signal transmission line to the ground, and a second resistor connecting the second signal transmission line to a power supply, for eliminating an influence of produced reflected waves.

11. The multiplex transmission system according to claim 10, wherein the terminal circuits further include third resistors connecting intermediate portions of the signal transmission lines to each other, for lowering the impedance of the signal transmission lines and eliminating the influence of produced reflected waves.

12. A multiplex transmission system including at least two multiplex nodes interconnected by two signal transmission lines for data transmission among the multiplex nodes, comprising:

two terminal circuits individually connected to the signal transmission lines at respective ends thereof, and having two resistance elements and at least one capacitor, for stabilizing transmission waveforms, said two resistance elements being connected in series between the ends of the signal transmission lines, and said at least one capacitor for being connected between a junction of said resistance elements and ground potential;

each of the multiplex nodes including a transmitter circuit and a receiver circuit, each connected to the signal transmission lines, for respectively transmitting data to and receiving data from other multiplex nodes;

each of the transmitter circuits including one of a capacitor and an inductor for controlling a switching speed thereof when the transmission lines are driven; and each of the two terminal circuits further including a capacitor for stabilizing transmission waveforms, to suppress noise produced on the signal transmission lines due to a steep edge component of a pulse and an unbalanced switching speed of the transmitter circuit when the signal transmission lines are driven by the transmitter circuit.

13. The multiplex transmission system according to claim 12, wherein the two terminal circuits each further comprise:

a first resistor connecting one of the signal transmission lines to ground potential; and a second resistor connecting the other of the signal transmission lines to a power supply voltage, for eliminating an influence of produced reflected waves.

14. The multiplex transmission system according to claim 13, wherein the two terminal circuits each further comprise a third resistor connecting intermediate portions of the signal transmission lines to each other, for lowering an impedance of the signal transmission lines and for further eliminating the influence of produced reflected waves.

* * * * *